(12) United States Patent
Holtzman

(10) Patent No.: US 10,977,722 B2
(45) Date of Patent: Apr. 13, 2021

(54) SYSTEM, METHOD AND USER INTERFACES AND DATA STRUCTURES IN A CROSS-PLATFORM FACILITY FOR PROVIDING CONTENT GENERATION TOOLS AND CONSUMER EXPERIENCE

(71) Applicant: IM Pro Makeup NY LP, New York, NY (US)

(72) Inventor: Oran Holtzman, New York, NY (US)

(73) Assignee: IM PRO MAKEUP NY LP, New York, NY (US)

( * ) Notice: Subject to any disclaimer, the term of this patent is extended or adjusted under 35 U.S.C. 154(b) by 0 days.

(21) Appl. No.: 16/388,424

(22) Filed: Apr. 18, 2019

(65) Prior Publication Data
US 2020/0058063 A1 Feb. 20, 2020

Related U.S. Application Data

(60) Provisional application No. 62/720,037, filed on Aug. 20, 2018.

(51) Int. Cl.
*G06Q 30/00* (2012.01)
*G06Q 30/06* (2012.01)
(Continued)

(52) U.S. Cl.
CPC ..... *G06Q 30/0643* (2013.01); *G06Q 30/0246* (2013.01); *G06Q 30/0273* (2013.01);
(Continued)

(58) Field of Classification Search
CPC .......... G06Q 30/643; G06Q 30/0621; G06Q 30/0246; G06Q 30/0613; G06Q 30/0277; G06Q 30/0273; G06Q 50/01
(Continued)

(56) References Cited

U.S. PATENT DOCUMENTS 6,480,885 B1 11/2002 Oliver
7,917,448 B2 3/2011 Smola et al.
(Continued)

FOREIGN PATENT DOCUMENTS

CA 2923823 A1 9/2016
CA 2755577 C 4/2018
WO 2017059592 A1 4/2017

OTHER PUBLICATIONS

Karpischek, S., Michahelles, F. "my2cents—Digitizing consumer opinions and comments about retail products." 2010 Internet of Things (IOT) (pp. 1-7). Nov. 2010. (Year: 2010).*

*Primary Examiner* — Anand Loharikar
(74) *Attorney, Agent, or Firm* — Duncan Galloway Egan Greenwald PLLC; Kevin T. Duncan

(57) ABSTRACT

A cross-platform service engages and connects influencers and consumers by facilitating content generation in connection with electronic-commerce platform. An influencer/content generator facing portal presents a set of tools to enable influencers to create content for use on the e-commerce side and to facilitate transactions related to influencer compensation. A consumer facing portal presents adaptive user interfaces to engage remotely connected consumers by presenting influencer-generated "looks" and tools to selectively navigate and select/deselect presented looks and explore look and products and ultimately to handle transactions for purchasing of products.

11 Claims, 33 Drawing Sheets

(51) Int. Cl.
    *G06Q 30/02*     (2012.01)
    *G06Q 50/00*     (2012.01)
(52) U.S. Cl.
    CPC ..... *G06Q 30/0277* (2013.01); *G06Q 30/0613* (2013.01); *G06Q 30/0621* (2013.01); *G06Q 50/01* (2013.01)
(58) Field of Classification Search
    USPC .............................................. 705/26.1–27.2
    See application file for complete search history.

(56) References Cited

U.S. PATENT DOCUMENTS

| | | |
|---|---|---|
| 8,060,463 B1 | 11/2011 | Spiegel |
| 8,180,804 B1 | 4/2012 | Moldaysky |
| 8,566,327 B2 | 10/2013 | Carrico et al. |
| D781,311 S | 3/2017 | Rad et al. |
| D781,882 S | 3/2017 | Rad et al. |
| 9,733,811 B2 | 8/2017 | Rad et al. |
| D816,686 S | 5/2018 | Rapp et al. |
| 2005/0021750 A1 | 1/2005 | Abrams |
| 2005/0027707 A1 | 2/2005 | Syed |
| 2006/0059147 A1 | 3/2006 | Weiss et al. |
| 2006/0085419 A1 | 4/2006 | Rosen |
| 2006/0106780 A1 | 5/2006 | Dagan |
| 2007/0073687 A1 | 3/2007 | Terrill et al. |
| 2007/0073803 A1 | 3/2007 | Terrill et al. |
| 2008/0196094 A1 | 8/2008 | Benschop |
| 2008/0294624 A1 | 11/2008 | Kanigsberg et al. |
| 2008/0301118 A1 | 12/2008 | Chien et al. |
| 2009/0106040 A1 | 4/2009 | Jones |
| 2010/0125632 A1 | 5/2010 | Leonard |
| 2011/0087974 A1 | 4/2011 | Kulas |
| 2011/0196927 A1 | 8/2011 | Vance |
| 2012/0088524 A1 | 4/2012 | Moldaysky |
| 2014/0040368 A1 | 2/2014 | Janssens |
| 2014/0074824 A1 | 3/2014 | Rad |
| 2014/0278998 A1* | 9/2014 | Systrom ............ G06Q 30/0277 705/14.57 |
| 2016/0364812 A1 | 12/2016 | Cao |
| 2017/0024120 A1 | 1/2017 | Shunock |
| 2017/0316515 A1 | 11/2017 | Varma |
| 2018/0292887 A1 | 10/2018 | Bastide et al. |

* cited by examiner

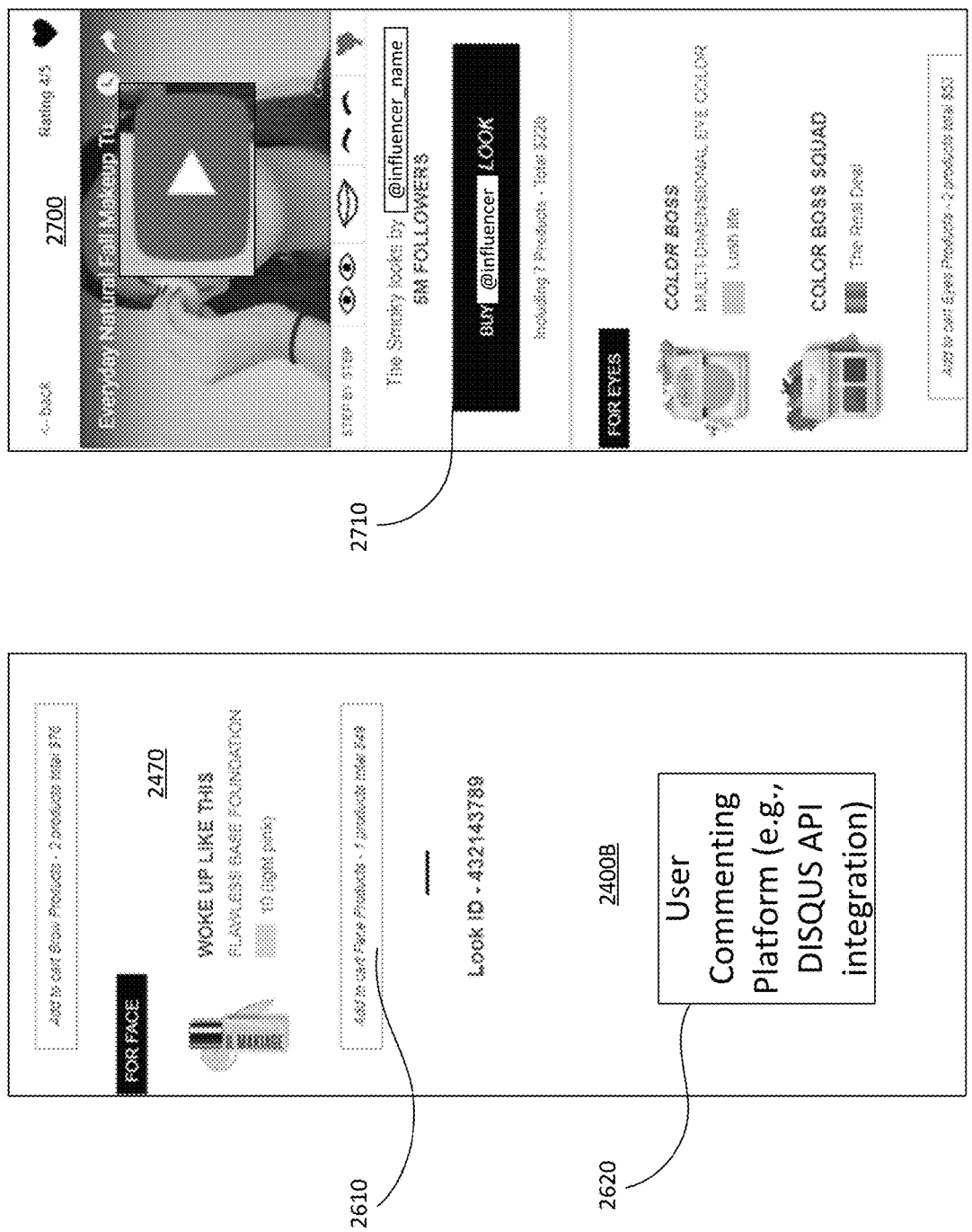

DIRECT BEAUTY ONLINE – LOW ENGAGEMENT IS ACROSS BRANDS

- LOW TRAFFIC (ESPECIALLY FOR NON-CELEB BRANDS)
- LOW TIME ON SITE = 2 - 4 MIN –> LOW ENGAGEMENT
- HIGH BOUNCE RATE = 40 - 50% –> LOW ENGAGEMENT
- LOW CR – ESPECIALLY FOR NEW USERS

| Competitor | Avg. traffic/month | Visit Duration |
|---|---|---|
| Pat McGrath | 183,333 | 02:37 |
| Glossier | 1,800,000 | 03:58 |
| Charlotte Tilbury | 680,000 | 03:47 |
| Becca Cosmetics | 190,000 | 03:09 |
| Cover FX | 123,333 | 02:09 |
| Marc Jacobs Beauty | 108,667 | 02:04 |
| Fenty Beauty | 1,050,000 | 03:03 |
| Kylie Cosmetics | 1,633,333 | 03:06 |
| Anastasia Beverly Hills | 800,000 | 02:28 |
| Kopari Beauty | 83,333 | 02:46 |
| Limecrime | 853,333 | 03:53 |
| Fashion Nova | 13,660,000 | 08:31 |
| Asos | 80,000,000 | 08:07 |
| Boohoo | 13,000,000 | 08:07 |

SYSTEM, METHOD AND USER INTERFACES AND DATA STRUCTURES IN A CROSS-PLATFORM FACILITY FOR PROVIDING CONTENT GENERATION TOOLS AND CONSUMER EXPERIENCE

CROSS-REFERENCE TO RELATED APPLICATION

The present application claims benefit of priority to U.S. Provisional Patent Application 62/720,037, entitled SYSTEM, METHOD AND USER INTERFACES AND DATA STRUCTURES IN A CROSS-PLATFORM FACILITY FOR PROVIDING CONTENT GENERATION TOOLS AND CONSUMER EXPERIENCE (Holtzman), filed Aug. 20, 2018, which is incorporated by reference herein in its entirety.

FIELD OF THE INVENTION

The present application generally relates to systems and methods for providing content generation and e-commerce services in conjunction with processing electronic transactions. More specifically, the present invention relates to systems, methods and user interfaces and data structures in a cross-platform service for facilitating content generation in connection with electronic-commerce platform.

BACKGROUND OF THE INVENTION

With the advent of the Internet and increasing access via communications network, a trend has been for consumers to increasingly buy goods through e-commerce sites, including e-commerce facilities associated with traditional brick and mortar retail stores. However, not all products are alike and adoption of online shopping and purchasing is different with documented online sales of some goods, specifically including make-up and beauty products, being comparatively lower showing a less developed transition by consumers to online purchasing. FIG. 45, statistical data available from https://www.similarweb.com/, shows documented consumer statistics related to e-commerce websites in the area of direct beauty online. The statistics show a low engagement (traffic volume, time spent on site, bounce rate) of consumers across brands illustrating the adoption is not company or product specific but rather a problem endemic to the beauty industry. Contrasting statistics are shown toward the bottom of the chart showing more positive engagement statistics for fashion related concerns (Fashion Nova, Asos, Boohoo). It is clear that a problem exists specifically in the make-up and beauty market in providing an online experience that effectively engages consumers from product exploration, education, and purchase.

What is needed is a solution that provides an online experience that effectively engages consumers in product exploration, education, and purchase in the area of online beauty sales.

One critical problem facing the beauty industry in presenting effective e-commerce consumer experience is in presenting very personal products, make-up and skin and beauty products, to consumers in a way that brings to life how such products can be used by the consumer to achieve a desired state. For many other products, e.g., a piece of luggage, a pair of shoes, and a set of speakers, most consumers have a well-established set of expectations and by simply looking at the product and related description can associate the benefits and advantages and readily make an informed purchasing decision. Beauty products, e.g., lipstick, rouge, foundation, eye liner, mascara, gels, eye shadow, and brushes and other tools for product application, are not easily presented to consumers in an online manner. Moreover, as opposed to many products that may come in one or two color options that deal very simply and one-dimensionally with a look of the product, beauty products may come in hundreds if not thousands of distinct colors and vastly more thousands of color combinations, e.g., overall color combination, and resulting "look," of color X1 (lip stick), color Y1 (foundation), color Y2 (rouge), color Z1 (eye liner), color Z2 (eye shadow), and so forth. In addition, the resulting "look" is affected by the particular application and perhaps brush or other tool used in the application. Also, additional colors of product may be added or blended to create a desired look. No existing website provides any sort of user experience to present such possible combinations of products or applications in an online manner to consumers. Historically, consumers shopping for beauty products in brick and mortar stores engage with sales personnel and can apply certain make-up products in person and have immediate feedback by looking in the mirror to see the resulting effect, i.e., the "look"—how the make-up looks on their face, and with that information decide to purchase or try another color or another product.

What is needed is an online facility that is capable of delivering a consumer with a real-world experience related to shopping and selecting beauty products.

Given the almost limitless combinations of beauty products, it would be very costly for a beauty company to try to present all the possible permutations of products much less "looks" as applied to individuals' faces. Although there are many blogs with so-called "influencers", social media content creators who demonstrate products, the beauty industry has not effectively engaged influencers as a way to directly engage with consumers on its e-commerce platforms. One key problem is no beauty company provides a way for influencers to apply/sign-up as associates or artists on staff of the beauty company.

What is needed is an innovative online facility capable of engaging influencers to generate content for presenting to consumers to facilitate selection and purchase of product and to provide compensation to influencers commensurate with their effectiveness with consumers.

Another problem facing e-commerce concerns is the array of platforms, including social media and content delivery sites (e.g., YOUTUBE) and the lack of a cross-platform client-server facility capable of connecting sites and tools and content of interest to users, including influencers and consumers, to effectively engage such users to result in increased online engagement and product sales.

What is needed is an innovative cross-platform facility capable of providing a dual influencer/consumer client-side experience via a central server architecture and having a social media component.

SUMMARY OF THE INVENTION

The present invention provides a new paradigm for engaging influencers and consumers in connection with online sale of beauty-related products. Existing beauty online sales sites simply, and ineffectively, present users with a series of pages showing beauty products as SKUs and simply items for purchase in a box or tube. In this manner the existing systems present products disassociated from any purpose and end-result, i.e., what is it going to look like on the consumer. The invention provides a new and powerful consumer-engagement platform to present products as a "look" generated not by models for the beauty company but by influencers. The continuing growth of the influence of influencers has been widely acknowledged and discussed, e.g., see "Influencers Are The Vital Signs Of Your Brand," Forbes, Aug. 14, 2018 (https://www.forbes.com/sites/forbestechcouncil/2018/08/14/influencers-are-the-vital-signs-of-your-brand/#7c386a7c61fa), and "10 Reasons Why Influencer Marketing is the Next Big Thing," Adweek, Jul. 14, 2015, (https://www.adweek.com/digital/10-reasons-why-influencer-marketing-is-the-next-big-thing/).

Social media continues to grow as an area of user interaction and commentary. Much of the interaction involves discussion of products and companies have an increasing awareness and emphasis on corporate social media presence. Influencer/influence marketing by companies is based on engaging individuals known as "influencers" who are widely followed on social media, blogs, and the like ("social influence"). Influencers are viewed by followers as fellow individuals and consumers of products—not paid shills. The influencers audience ("followers") are consumers and are attracted to influencers based on their postings (seen as unbiased), which may include various forms of generated content, e.g., video, photos, text, articles, and other content or links to content. Influencer postings typically relate to defined areas of interest, e.g., fashion, food, repair, decorating, DIYer projects, etc. While many such individuals post on matters purely for educating or attracting followers, many have established contracts and other forms of compensation for attracting people to websites or to products related to and presented as part of the influencer posting. Influencer marketing is a vehicle to establish loose interactions, often in a social community of sorts, among influencer and followers to present products and information about products. Thus, influencer marketing is a way for brands to market to potential consumers indirectly via influential people rather directly. Often influencer content is presented as unbiased testimonial advertising and the influencer may play the role of a potential buyer of the presented product. This has been found to be a very effective form of presenting products in a less direct and coercive experience for consumers. By identifying and engaging individuals having influence over potential customers of interest (those most likely to be interested in the seller's products), the brand can orient product marketing around influencers. The overall theme has been referred to as RACE—Reach, Act, Convert and Engage followers/consumers.

The present invention provides: 1) an e-commerce system having an influencer/content generator facing client-side, a consumer facing client-side, and adaptive user interfaces and database management capabilities to serve both while facilitating user access and inter-operation of social media and other external systems; 2) an electronic cross-platform facility to engage and connect influencers and consumers; 3) a content generator "influencer" client-side application and user interface to engage influencers, to present a set of tools to enable influencers to create content for use on the e-commerce side, and to facilitate transactions related to influencer compensation; 4) a consumer client-side application and user interface to engage remotely connected consumers, e.g., by presenting influencer-generated "looks" and providing tools to allow consumer users to selectively navigate through presented looks. The consumer user interface enables the user to select/deselect (or disregard) looks, e.g., like/dislike buttons or swipes left or right, and to drill down further to access more information about selected looks, more information about products associated with the selected looks, and ultimately to handle transactions for purchasing products.

In a first embodiment, the present invention provides a system for facilitating content generation and consumer engagement related to sale of goods or services, the system comprising: a central application server having a processor and a memory, the memory having stored thereon computer executable code, the central application server adapted to communicate with remote devices over a communications network; at least one database adapted to store information and content related to product/service offerings, including user records, user generated content, and product/service records; a first set of executable code executed by the processor to manage an influencer portal and cause the central application server to: communicate with a first remote device associated with a first user, the first user being an influencer-type user; associate a first user record of an influencer type with the first user and store the first user record on the database; transmit for display at the first remote device a user interface adapted to enable the first user to input information related to a "first look"; receive from the first remote device a first set of content related to the first look, the first set of content being created by the first user and including a first product/service associated with a product/service record stored in the database; and assign a unique identifier to the first look, store the unique identifier and the first set of content in the database and associate the first look and the first set of content with the first user record; and a second set of executable code executed by the processor to manage a consumer portal and cause the central application server to: communicate with a second remote device associated with a second user, the second user being a consumer-type user; and transmit for display at the second remote device via a user interface a plurality of images associated with a plurality of looks including the first look and a set of user selectable elements for selecting/deselecting presented images and associated looks.

The system of the above embodiment may be further characterized in one or more of the following: wherein the second set of executable code executed by the processor is further adapted to cause the central application server to receive a request from the second user via the user interface for a more complete presentation of a set of content associated with an image selected from the plurality of images; wherein the second set of executable code executed by the processor is further adapted to cause the central application server to associate a second user record of a consumer type with the second user and store the second user record on the database; wherein the second set of executable code executed by the processor is further adapted to cause the central application server to: receive signals associated with user inputs entered by the second user; and present a reduced set of selected images in response to the received signal.

The system of the above embodiment may be further characterized in one or more of the following: wherein the second set of executable code executed by the processor is further adapted to cause the central application server to: receive a signal representing an image selected from the plurality of images; and update the database a record associated with the selected image.

The system of the above embodiment may be further characterized in one or more of the following: wherein the second set of executable code executed by the processor is further adapted to cause the central application server to transmit to the second remote device a set of product information, the set of product information being related to a product linked to an image selected from the plurality of images; wherein the second set of executable code executed by the processor is further adapted to cause the central application server to transmit to the second remote device the first set of content in response to the second user selecting an image associated with the first look; wherein the second set of executable code executed by the processor is further adapted to cause the central application server to transmit to the second remote device product information including links or other user interface elements to facilitate purchase of a presented and selected product associated with the first look; wherein the second set of executable code executed by the processor is further adapted to cause the central application server to facilitate a transaction related to the sale of a selected product by the second user and record a credit to the first user related to the selection of the image associated with the first look; further comprising a communications interface for establishing connection(s) with one or more third-party platform or services, including at least one of: an influencer metric and payment processor; a user commentary interface; social media services (e.g., INSTAGRAM); and content delivery services (e.g., YOUTUBE).

In another embodiment, the present invention provides a method for facilitating content generation and consumer engagement related to sale of goods or services in a system comprising a central server and connected database in electrical communication with a plurality of remote user-operated devices, the method comprising: storing on a database information and content related to product/service offerings, including user records, user generated content, and product/service records; at a first time establishing a first connection between a central server and a first remote device via an influencer portal, the first remote device being associated with a first user, the first user being an influencer-type user; associating a first user record of an influencer type with the first user and storing the first user record on the database; transmitting for display at the first remote device a user interface adapted to enable the first user to input information related to a "first look"; receiving from the first remote device a first set of content related to the first look, the first set of content being created by the first user and including a first product/service associated with a product/service record stored in the database; and assigning a unique identifier to the first look, storing the unique identifier and the first set of content in the database and associating the first look and the first set of content with the first user record; at a second time establishing a second connection between the central server and a second remote device, the second remote device being associated with a second user, the second user being a consumer-type user; and transmitting for display at the second remote device via a user interface a plurality of images associated with a plurality of looks including the first look and a set of user selectable elements for selecting/deselecting presented images and associated looks.

The method may be further characterized in one or more of the following: further comprising receiving a request from the second user via the user interface for a more complete presentation of a set of content associated with an image selected from the plurality of images; further comprising associating a second user record of a consumer type with the second user and storing the second user record on the database; further comprising: receiving signals associated with user inputs entered by the second user; and presenting a reduced set of selected images in response to the received signal.

The method may be further characterized in one or more of the following: further comprising: receiving a signal representing an image selected from the plurality of images; and updating the database a record associated with the selected image.

The method may be further characterized in one or more of the following: further comprising transmitting to the second remote device a set of product information, the set of product information being related to a product linked to an image selected from the plurality of images; further comprising transmitting to the second remote device the first set of content in response to the second user selecting an image associated with the first look; further comprising transmitting to the second remote device product information including links or other user interface elements to facilitate purchase of a presented and selected product associated with the first look; further comprising facilitating a transaction related to the sale of a selected product by the second user and record a credit to the first user related to the selection of the image associated with the first look; and further comprising a communications interface for establishing connection(s) with one or more third-party platform or services, including at least one of: an influencer metric and payment processor; a user commentary interface; social media services (e.g., INSTAGRAM); and content delivery services (e.g., YOUTUBE).

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention but are intended to be exemplary and for reference.

FIGS. 17-43 provide a set of screenshots of exemplary user interfaces associated with an exemplary consumer-facing portal as implemented by the cross-platform system of the present invention.

FIG. 45 is a chart showing consumer engagement statistics illustrating the ineffectiveness of existing beauty-related e-commerce facilities with comparative data.

DETAILED DESCRIPTION OF THE INVENTION

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes or in any number of markets. Accordingly, the claims set forth below should be construed in view of the full breadth and spirit of the present invention as disclosed herein.

FIGS. 1-8 are schematic diagrams illustrating the interrelatedness of the various components associated with a cross-platform embodiment of the present invention. The modules and schema of FIGS. 1-8 provide the rules and logical operation for generating, presenting and implementing the user interface illustrated in the screens of FIGS. 9-43. The modules and schema of FIGS. 1-8 may be performed using the cross-platform architecture described below concerning the flow chart of FIG. 44 and the system of FIGS. 46-48.

Figure 1:
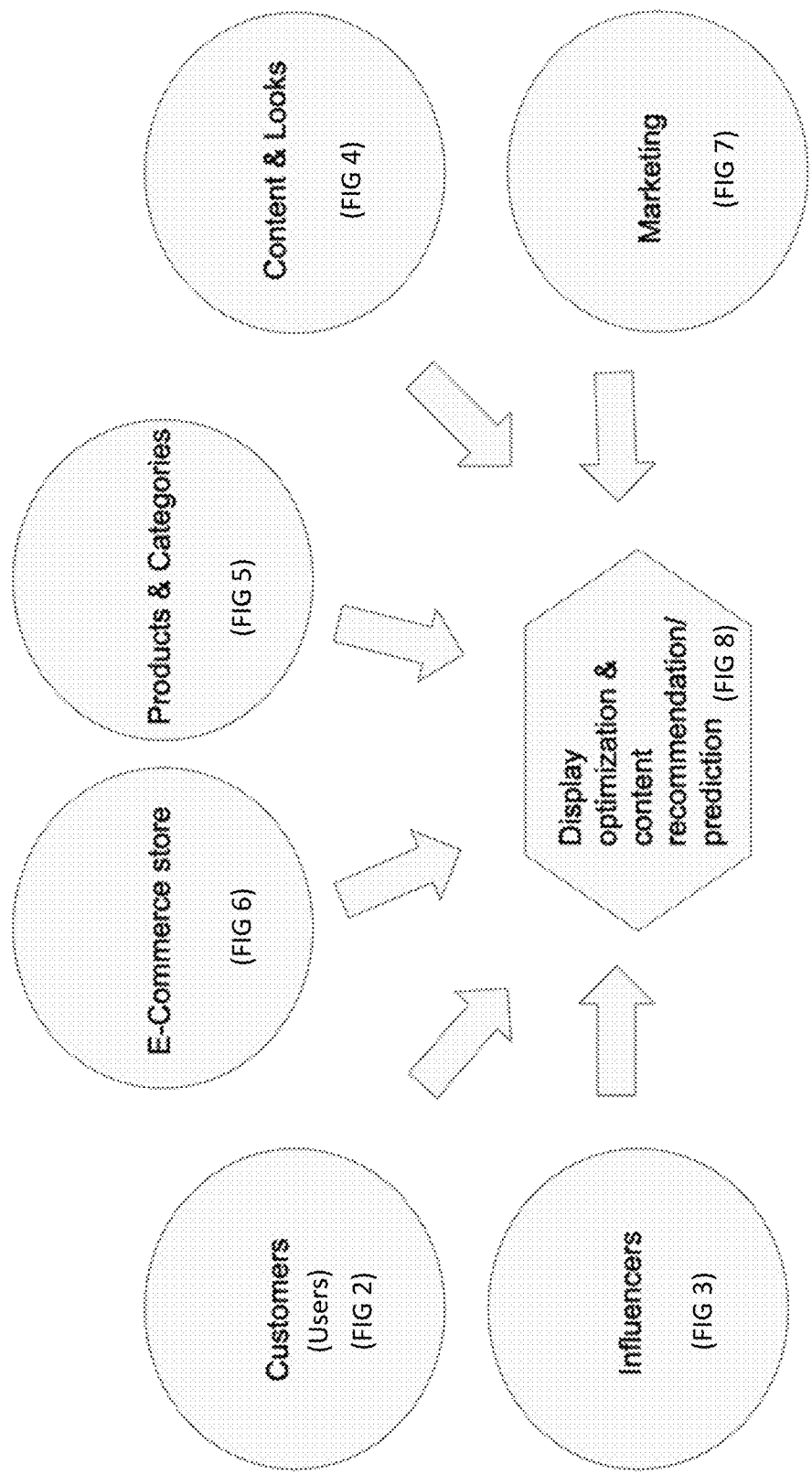
FIGS. 1-8 are schematic diagrams illustrating the interrelatedness of the various components associated with a cross-platform embodiment of the present invention.
Figure 2:
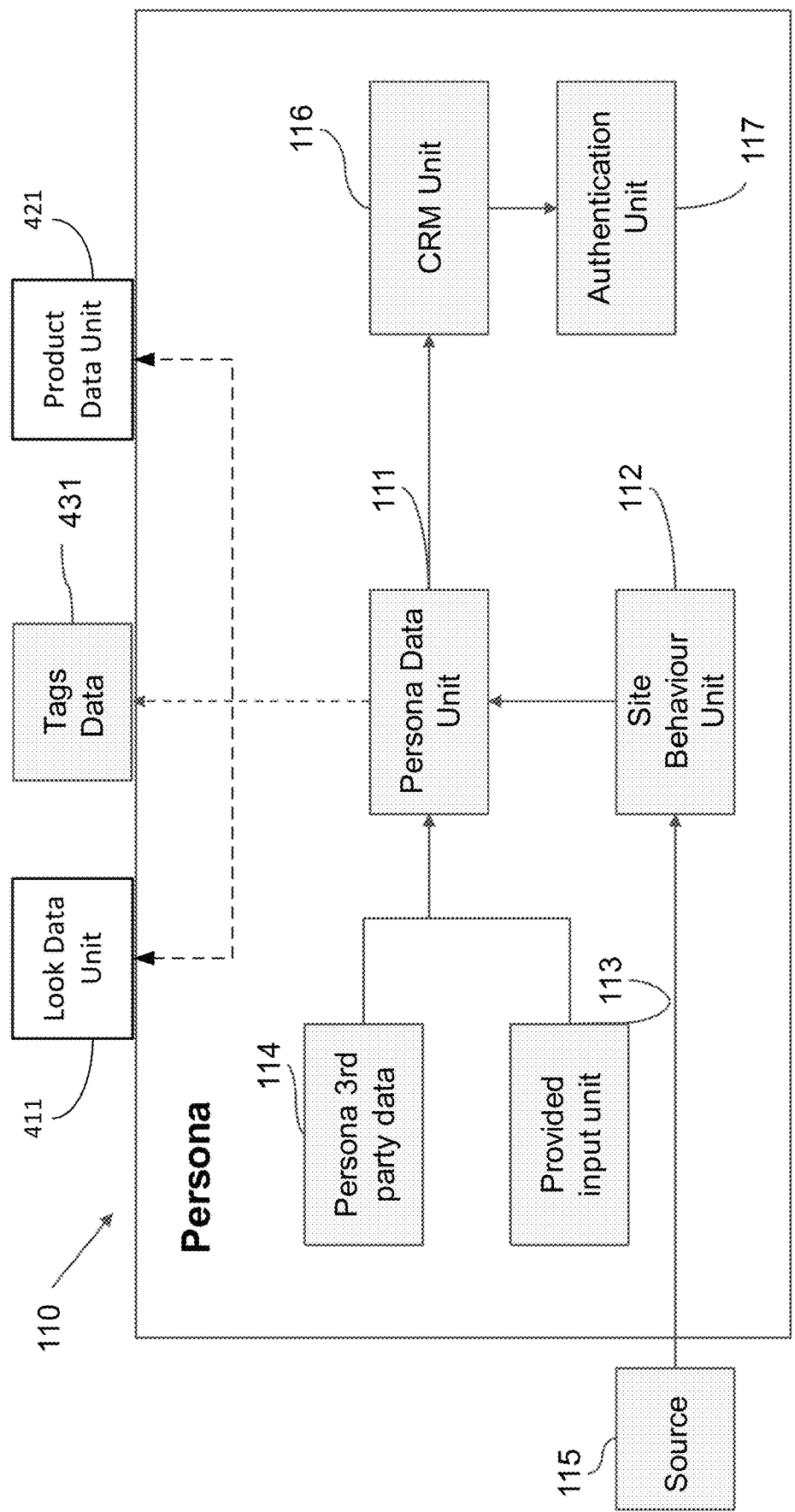
Figure 3:
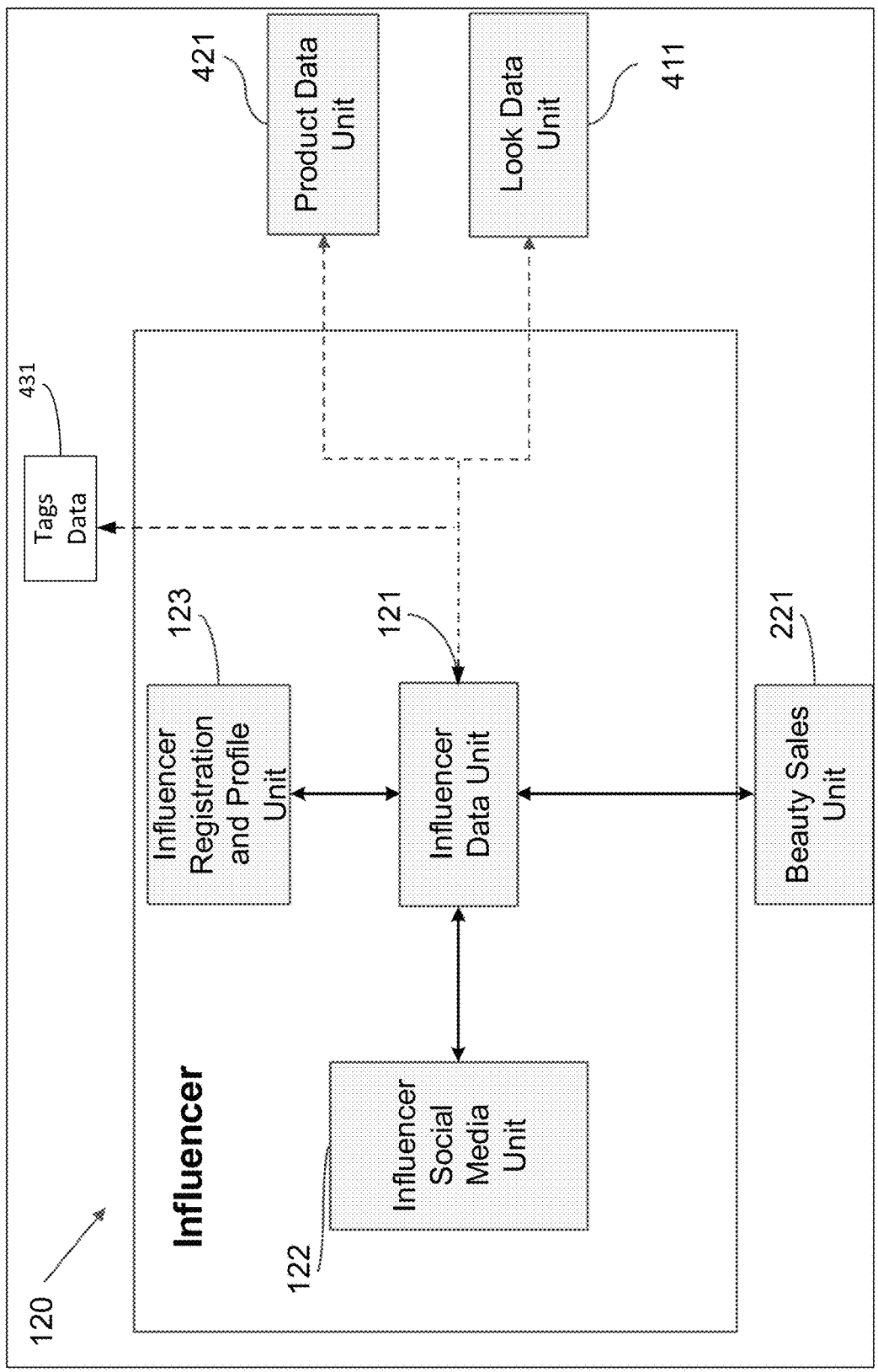
Figure 5:
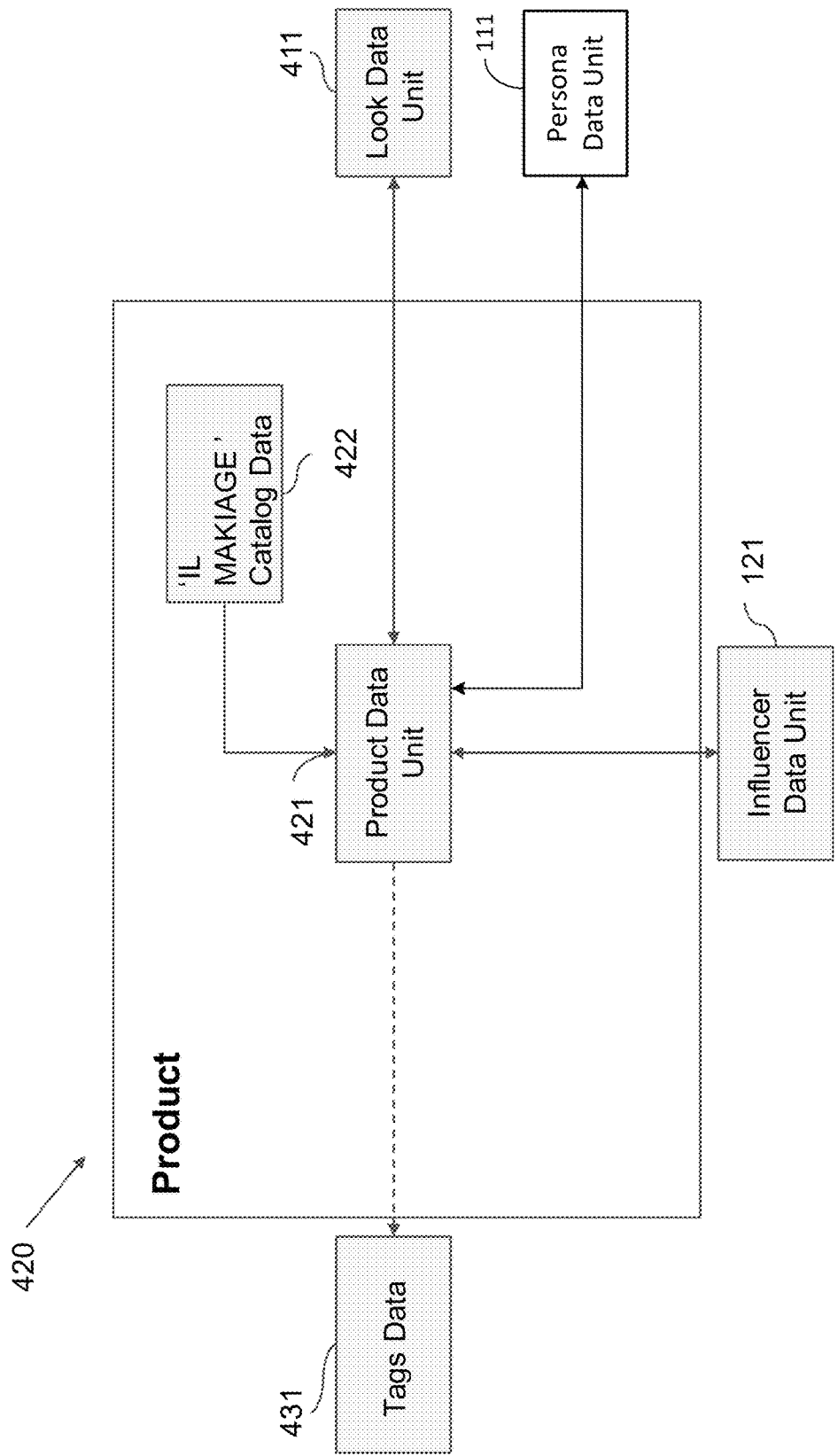
Figure 6:
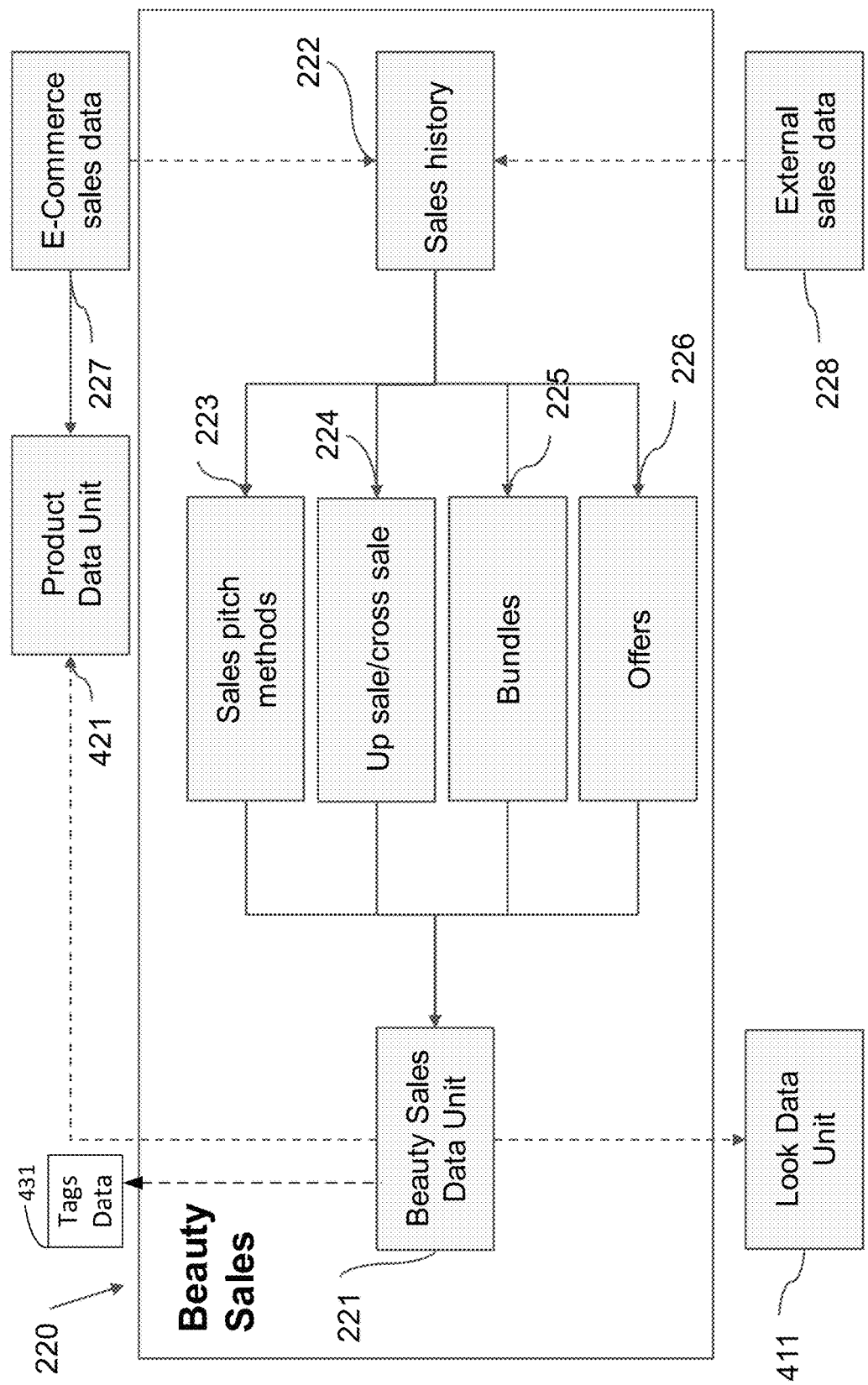
Figure 7:
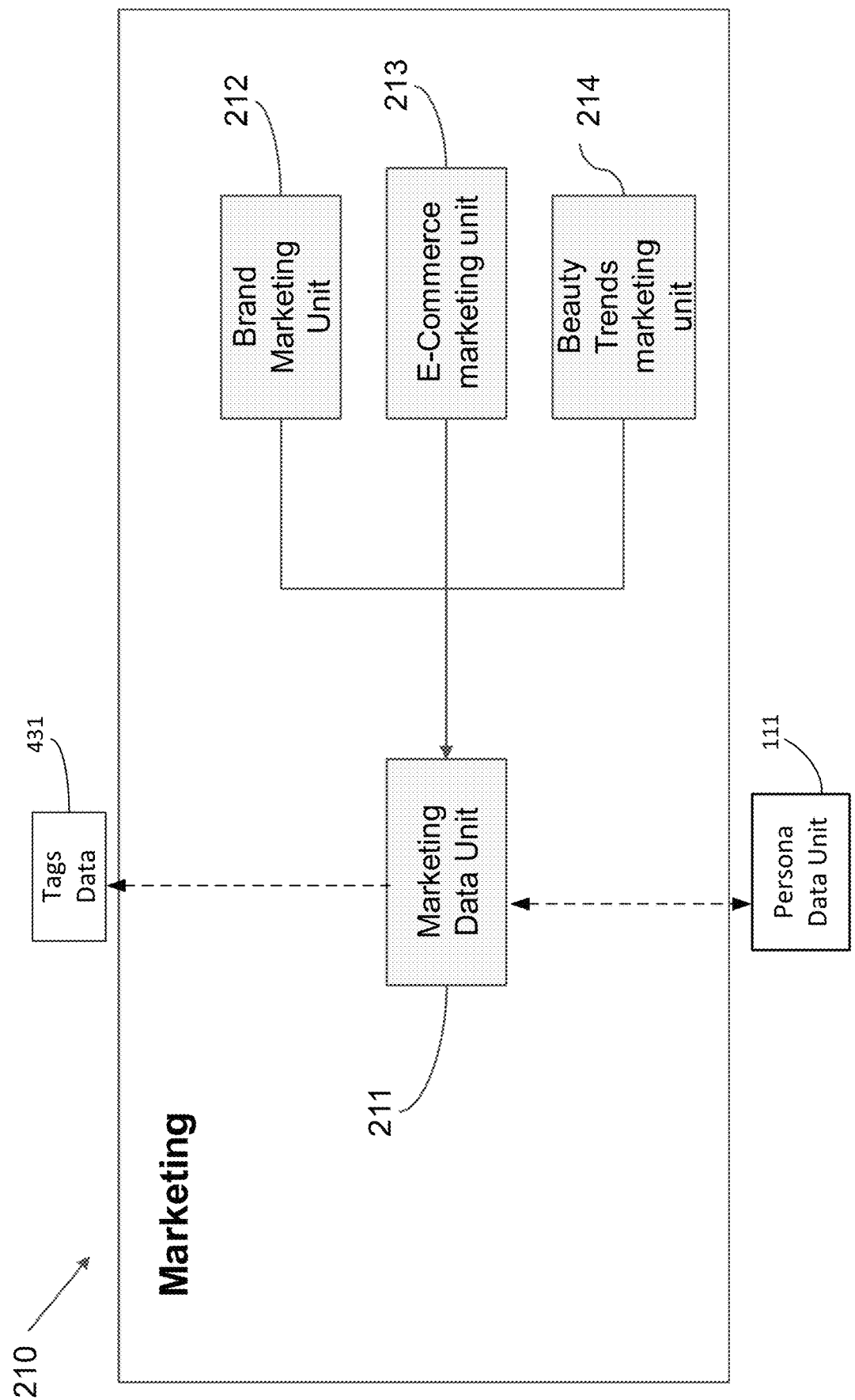

With reference to FIG. 1, an interactive website/app-based cross-platform content generation and commerce facility ("CGCF") system is represented in the schematic as having modules and schema represented by the following functional components: Influencers (FIG. 3); Customers or users (FIG. 2); E-commerce Store (FIG. 6); Products and Categories (FIG. 5); Content and Looks (FIG. 4); and Marketing (FIG. 7). The following describes the interaction of the components that make up the CGCF.

With reference to FIG. 2, a Persona Module 110 may be executed using a processor-based system with executable instructions stored in a memory and may be executed against data stored in one or more connected or accessible databases. Personal Module 110 includes Persona Data Unit 111, which provides a unit that contains data about the personas/users/customers using the website/app-based cross-platform CGCF described herein. The unit has a representation in associated database servers, which contain several collections/tables about the personas and their data. The schema contains data received from various sources, including: Provided input unit 113, Site Behavior Unit 112, and External third-party data 114.

Provided input unit 113 preferably includes data received from the user by input via user interface elements described in detail below or information about such data (metadata). The provided input data preferably includes metadata about the user and may include a plurality of the following: Personal data (age, gender, language); location; search criteria; filters applied by the user; history with company/presented products/websites/apps; history of user interactions, and general history with beauty products.

The Site Behavior Unit 112 preferably includes data about the behavior and usage of the persona in the website/app, and includes for example a plurality of the following: Source 115 (source of landing into the application from outside the website/app); Routes of app usage; Interactions within the app; Login state—anonymous or logged in; and Conversions and micro-conversions within the app.

The External third-party data 114, such as collected and stored in an associated database, preferably includes data about the user provided by third-party applications or systems, for instance: analytics; devices and browsers used to run the website/app; and campaign source.

In one manner of operation, the Personas, or personal user records, are handled in a Customer Relationship Management (CRM) system 116, which may use an authentication unit 117 to securely log in registered users for authorized access to personal information. However, the CGCF website/app also works with anonymous users albeit with possible limitations and limited access. Each Persona holds or is linked to a set or list of tags 431 and is updated by the Content Process Unit 311 (see FIG. 8). Each persona record may be linked to look data unit 411 and product data unit 421, e.g., when a consumer user selects certain looks and views or purchases certain products associated with selected looks or otherwise, e.g., when viewing products outside the look views context.

With reference to FIG. 3, an Influencer Module 120 provides an interface or portal for key content generation providers known as "influencers" (typically social media influencers)—individuals who, usually via social media, have established credibility in a specific industry or a following among groups of consumers. A social media influencer has access to and influence over a large audience.

Influencer Module 120 includes Influencer Data Unit 121, Influencer registration and profile unit 123, and Influencer social media unit 122. Influencer Data Unit 121 is a unit that contains data about the influencers that provide the looks content in the website/app. The unit has a representation in the database servers, which contain several collections/tables about the influencers and their data. The schema contains data received from various sources. Influencer registration and profile unit 123 includes data submitted by the influencers, which contains metadata about the influencers, for instance: Personal data (Age, Gender, Language); and Location; Social media accounts; and Images. Influencer social media unit 122 collects data from the social media accounts provided by the influencer, for instance: Followers; Engagement rate; Cross-followers; Collaborations and co-operations; and Advertising methods Influencer Module 120 interacts with several modules. Look Data Unit (411)—A unit that contains data about the looks. The influencer schema has data about the looks created by this influencer. Product Data Unit (421)—A unit that contains data about products. The influencer schema has data about products used by the influencer. Influencer Data Unit 121 may access tags data 431 to supplement or examine the tags listing and related product and other links. For example, if an influencer wants to tag their profile or record with certain terms related to themselves, then, if allowed, they may use Influencer Data Unit 121 to assign terms as tags to describe their personality, style, body type, facial type, etc. As discussed below, an influencer may use the Look Data Unit 411 to associate or assign or create tags to attach to their generated looks.

Figure 4:
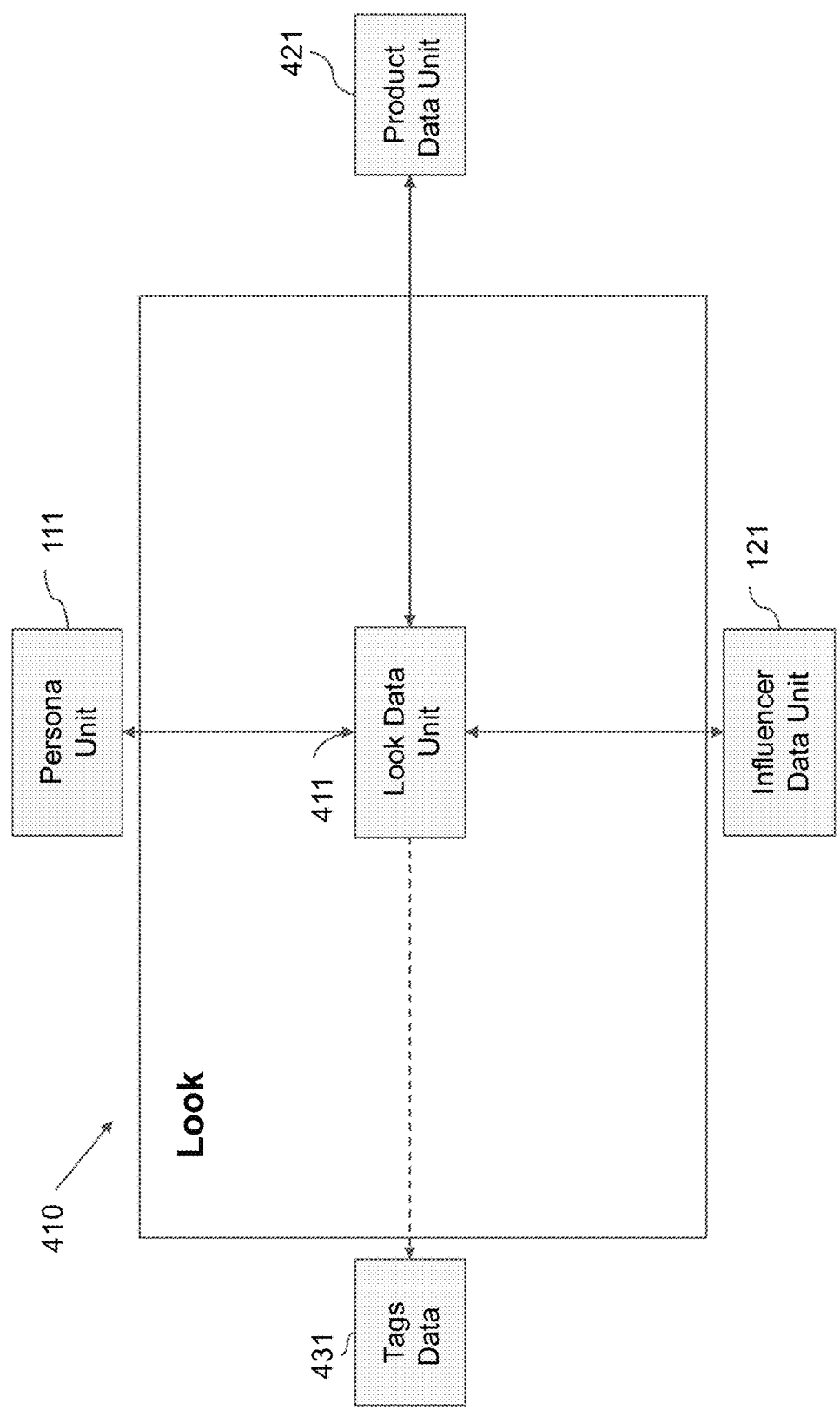

With reference to FIG. 4, a Look Module 410 provides users the ability to generate content related to looks that utilize products associated with the CGCF. Look Data Unit 411 is a unit that contains data about the looks shown via the CGCF website/application. The unit 411 has a representation in the database servers, which contain collections/tables about the looks. The schema related to Look Module 410 contains data received from various modules, including Influencers data unit 121; Products data unit 421; and Persona data unit 111. Influencers data unit 121 manages influencer data that contains for example: the influencer who created the look; information about the look given by the influencer; and media (e.g., images and videos) provided by the influencer for the look. Products data unit 421 manages products used by or associated with influencer created looks.

Figure 8:
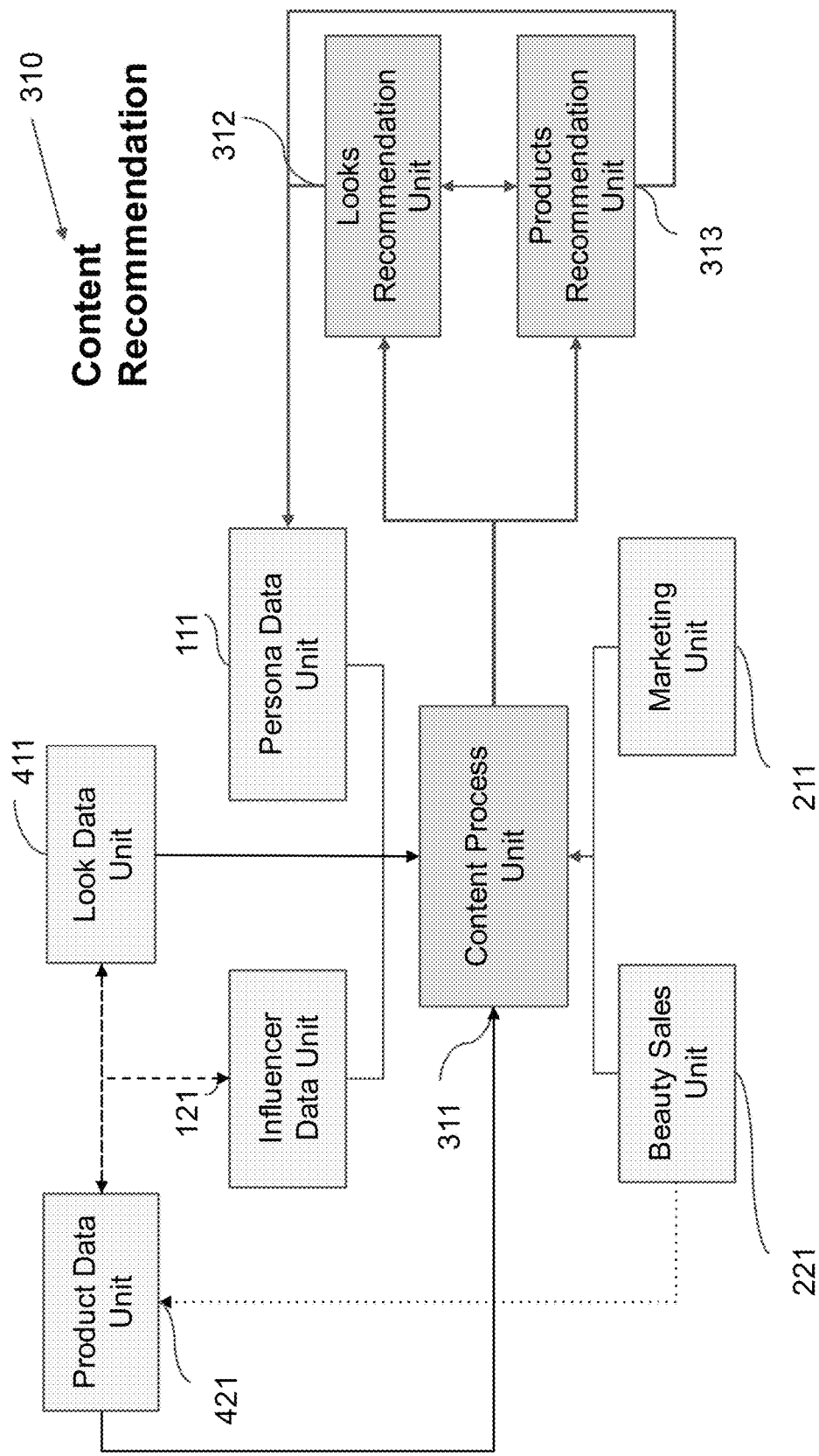
Figure 10:
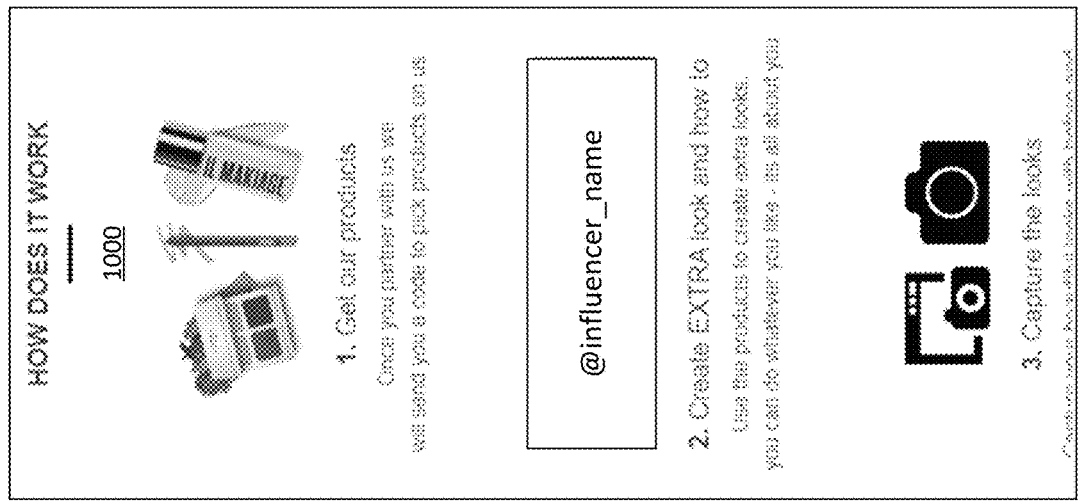
FIGS. 9-15 provide a set of screenshots of exemplary user interfaces associated with an exemplary influencer-facing portal as implemented by the cross-platform system of the present invention.
Figure 9:
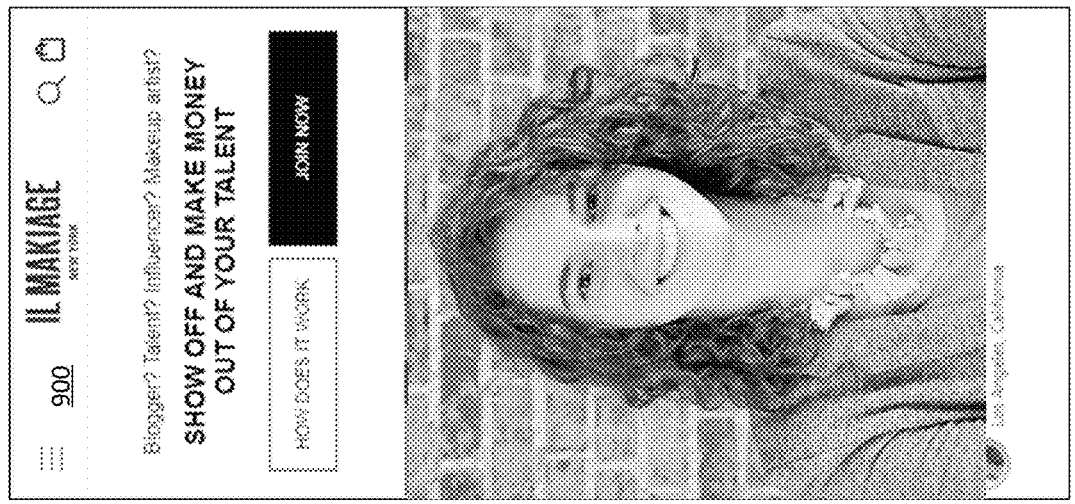
Figure 12:
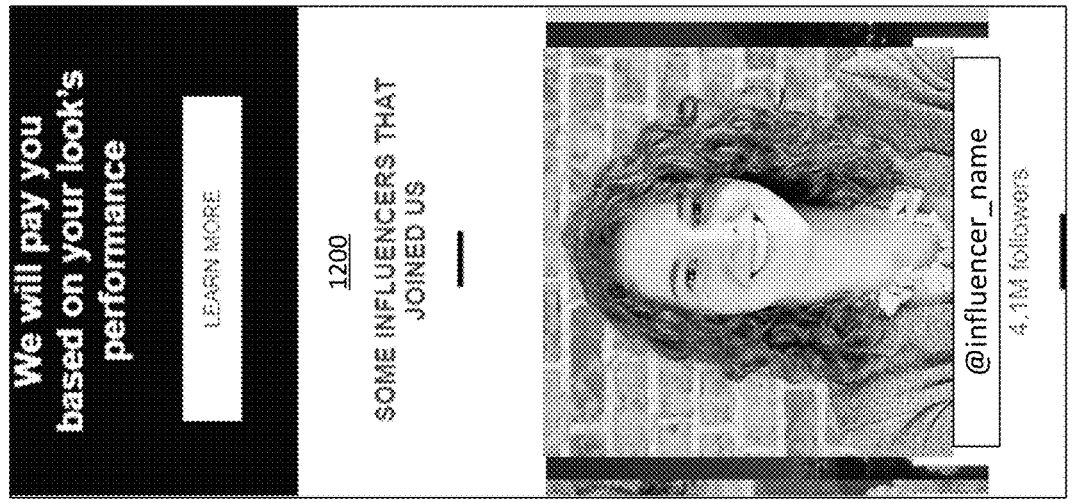
Figure 11:
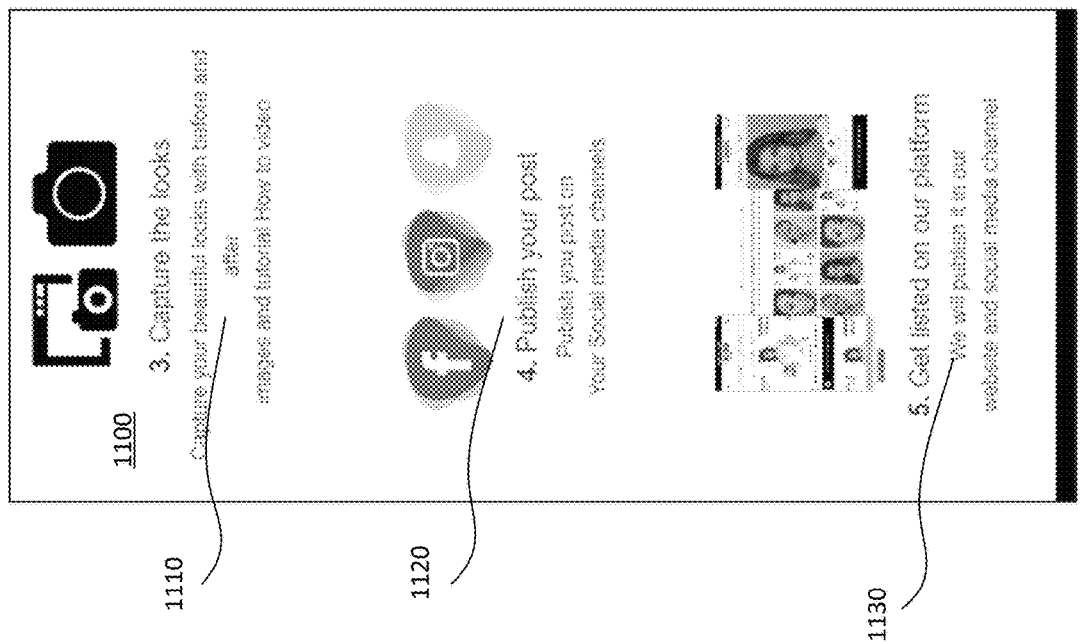
Figure 14:
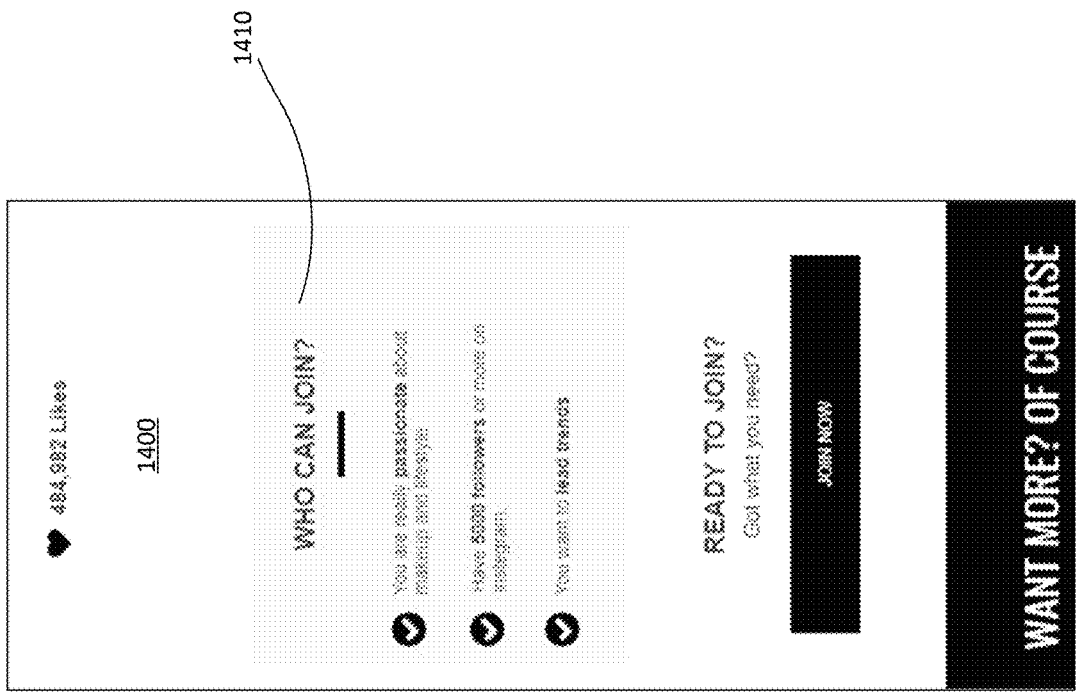
Figure 13:
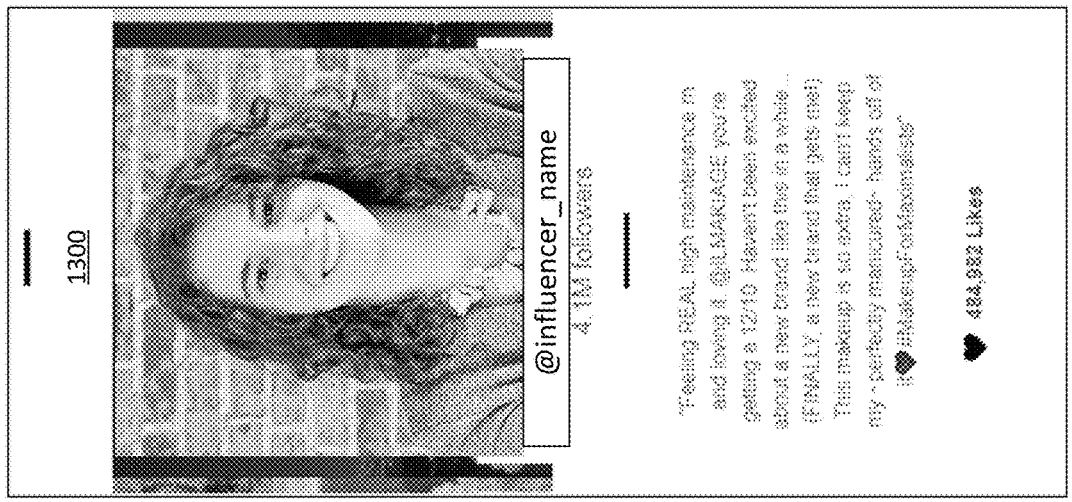
Figure 15:
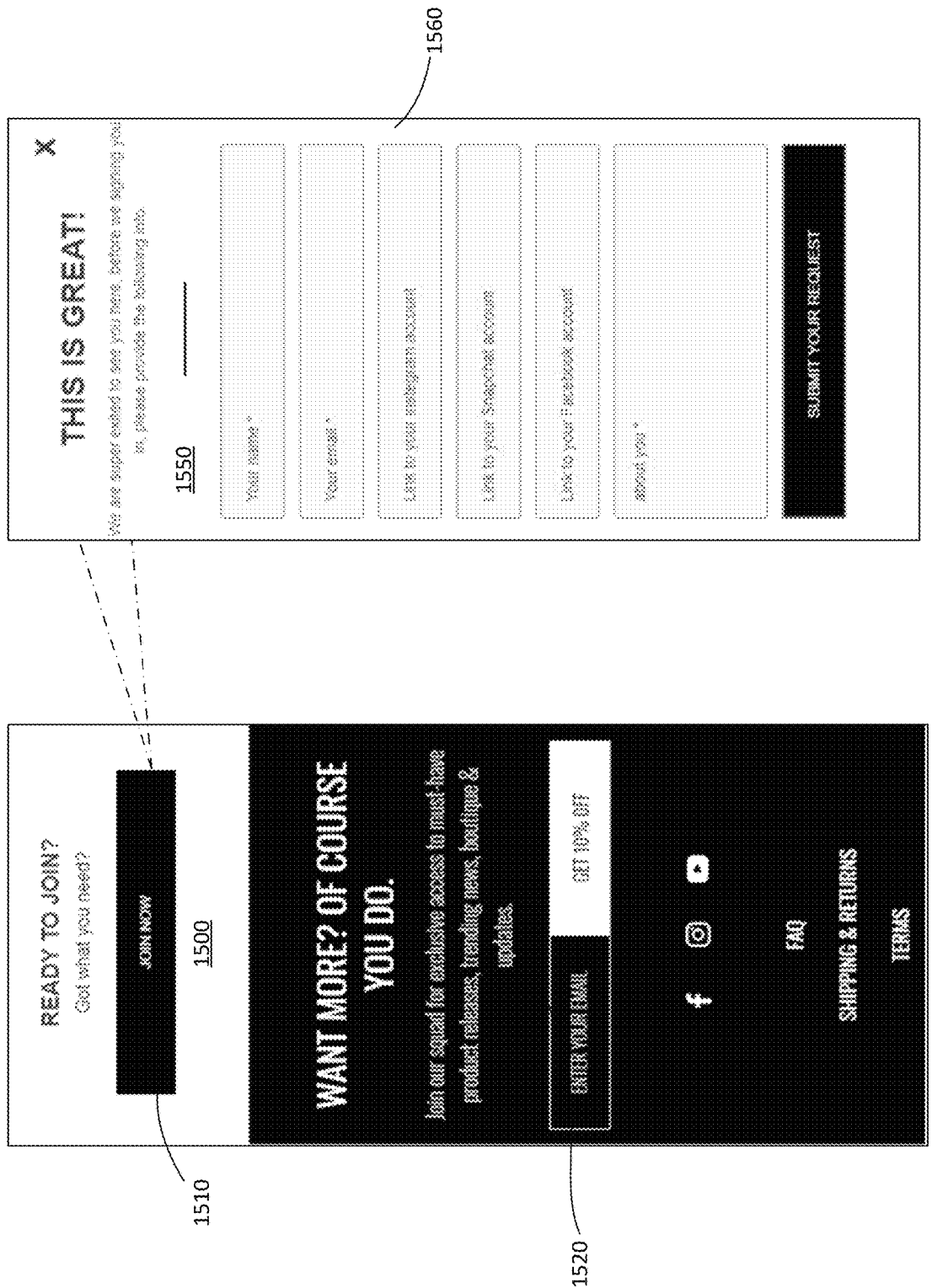

Persona data unit 111 maintains persona data related to and representing a history of interactions of users, e.g., inputs or interactions by users operating user interfaces that pertain to one or more influencer looks. Each "look" record or network of record links holds list of tags or tag data 431 provided by the influencer (e.g., see discussion related to FIG. 16C) and the system content administrators, and is updated by the Content Process Unit 311 (FIG. 8). For example, a consumer user searching, via a presented user interface, for looks of interest based on input search terms or queries may be presented with looks that have been tagged with matching search terms or terms linked or associated with a search term. In this manner the CGCF presents consumer users with a filtered set of looks for review.

With reference to FIG. 5, a Product Module 420 represents schema associated with maintaining and presenting information related to products associated with the CGCF. Product Data Unit 421 provides a unit that contains data about the products in the app. The Product Data Unit 421 has a representation in the database servers, which contain several collections/tables about the products. The schema contains data received from the CGCF, e.g., "IL MAKI-AGE" products catalog, representing a catalog 422 of a company's products and includes, for example: Products metadata (names, description); Products availability in stock; and Products used ingredients. The Product Data Unit 421 also contains data about, for example, Look Data Unit 411—looks using the product, and Influencer Data unit 121—influencers using the product. The Product Data Unit 421 may also contain data about Persona Data Unit 111—looks using the product, and Influencer Data unit 121—consumers purchasing the product and related processes, e.g., product returns, product ratings or user satisfaction.

In one manner of operation, each product supported by the Product Data Unit 421 includes in the holds a list of tags 431 provided by the system content admins and updated by the Content Process Unit 311.

With reference to FIG. 6, a Beauty Sales Module 220 includes Beauty Sales Data Unit 221, which is a unit that contains data useful to improve the sales of content. The data is collected from history of sales sub-module 222 and is gathered from the E-commerce platform 227 and external data. External data from outside the online platform 228 includes, for example, Physical stores sales; and data files related to and representing general beauty sales methods in the industry.

The Beauty Sales Data Unit 221 may contain, for example, info such as: Sales pitch methods 223; Cross sale/Up sale 224; Bundles 225; and Offers 226. The Beauty Sales Data Unit 221 enhances the data stored about looks and products, by applying extra fields to those modules, for example: texts to use when showing content; and which content should align with other content (bundles). Beauty Sales Data Unit 221 may access tags data 431 to supplement or examine the tags listing and related product and other links. For example, if retail consumer experience shows that in-store consumers use or prefer certain terms, then retail store users, if allowed, may use BSDU 221 to assign terms as tags to products or as synonyms for tagged terms.

With reference to FIG. 7, a Marketing Module 210 is adapted to promote products associated with the CGCF and includes Marketing Data Unit 211, a unit that contains data about ways to promote the content, gathered from several sources. The information/data is gathered via: Brand marketing data 212 (Brand decisions on marketing that comply to the brand trends such as brand campaigns, themes and best-sellers); E-Commerce marketing data 213 (ways to market products in e-commerce environments such as catalog, matching component, search); and Beauty trends marketing data 214 (ways to sell beauty products worldwide, such as general trends, social media, affiliates programs). The strategies are coded and selected on runtime based on content-admins decisions. Marketing Data Unit 211 may access tags data 431 to supplement or examine the tags listing and related product and other links. For example, if marking research shows that certain terms, which may be user search terms, have a beneficial role in product selection and purchase then MDU 211 may assign terms as tags to products or as synonyms for tagged terms. In addition, MDU 211 may access and otherwise interact with Persona Data Unit 111, e.g., to retrieve consumer related information to assist in marketing processes.

With reference to FIG. 8, a Content Recommendation module 310 includes algorithms and logic directed to access data gathered related to user interaction, e.g., look selection/deselection, influencer data, user or persona profile data including preferences, sales, etc. Content Recommendation module 310 includes Content Process Unit 311, which is a unit that collects data from all the above modules and generates an output of recommended content for the current persona using the web site/app, e.g., Recommended Looks 312, and Recommended products 313. Using machine learning, deep learning, and Artificial Intelligence (AI) modules, a recommending system is built based on: Past behavior of the persona; Relations to other personas; Content (Looks and products) similarity; and Context. In one embodiment, the recommending system used in the CGCF is hybrid, which can be done in either monolithic, parallelized or pipelined strategies, using recommending methods.

Collaborative filtering is a manner of finding personas that are similar and share same interests as the current persona to predict what the current persona will be interested in. The similarity may be based on different properties of the Persona 111 schema, which may have different weights (weights of properties may vary). This uses algorithms such as "Persona 111-based nearest neighbor," "Look 411-based nearest neighbor," "Product 421-based nearest neighbor," and "Influencer 121-based nearest neighbor." Content-based recommendations are based on content of products/looks the persona (user) interacted with (and may be differentiated from other personas interactions). This is done using the Tags 431 and properties of the products and looks. Each action the persona/user performs will contribute to a "Decision Tree" that will be held per a persona. Constraint-based knowledge system uses the users' specifications and requirements (explicit filters or search for example) and the system determines looks and products that meet the specific requirements. While the persona interacts with the content recommended to them, a Persona Profile keeps updating to enhance the recommending system. The CGCF may use machine-learning techniques in a semi-supervised process and/or automated process. For example, a training set of known or defined data may be used to train the recommendation system and continually updated actual persona data may be used to refine the recommendation system and processes based on actual user data and interactions.

After receiving the recommended looks and products, a second level of process is done by using Beauty-sales unit 221 that will suggest the best way to display the content and may suggest sales-approach for the first stage recommendations (bundles, offers, and more as described in the unit).

A third level is performed to decide the way to market the recommendations, based on the marketing unit 211 which decides based on weights and constraints what is the best way, place and time to display the recommendations, and what should be recommended, e.g., Looks, products, or both.

With reference now to FIGS. 9-43, a series of screenshots illustrating different aspects of the graphic user interface for the mobile app for the electronic platform of the present invention are provided. The following description includes references to the functional components of the cross-platform embodiment of FIGS. 46-48 as further described in detail hereinbelow.

FIGS. 9-15 illustrate exemplary influencer-type or influencer-facing client-side screenshots and user interfaces/elements, e.g., as served and presented to remote device 5816 via an influencer portal of the CGCF. As illustrated, the central server of the CGCF serves up an influencer (WWW-based) portal enabling influencers 5810 to navigate and sign up to participate in product related programs. The influencer portal allows influencers to create "looks" and load "look" content for the influencer program offered by a company operating central server 5830. As shown at screen 900, influencers are provided with elements to facilitate applying for participation. Associated with this process server 5830 will create an influencer account and profile/record with unique identification. Screen 1000 illustrates a mechanism for influencers to obtain product to use in creating "looks" and look-related content for uploading via server 5830. Image/video capture elements are provided to facilitate capturing influencer images and video.

Screen 1100 shows elements for interfacing with social media and other third-party platforms (FACEBOOK, INSTAGRAM, TWITTER) to publish influencer-generated content as well as the platform associated with server 5830 and the hosting entity. For example, utility 1110 enables an influencer to capture audio/video and/or photographs of looks the influencer creates. Utility 1120 interacts with third-party systems to enable an influencer to publish or post looks and other information to their social media accounts (e.g., FACEBOOK, INSTAGRAM, SNAPCHAT, and TWITTER). Utility 1130 enables an influencer to enlist on website and social media channels associated with the commercial entity providing the e-commerce system.

Screen 1200 illustrates elements to facilitate influencers receiving additional information concerning compensation and performance criteria associated with postings used to promote products sold via server 5830 to online customers 5820. Screens 1300, 1400, 1500 and 1550, and related utilities 1410, 1510, 1520 and 1560, further illustrate the process for engaging and enlisting influencers to promote products and generate associated content. In this example an influencer user selects user element 1510 to open up a sign-in or enlist screen 1550 and related input elements to enable the influencer to enlist in the program and by which the CGCF captures key information related to the particular influencer.

Figure 16A:
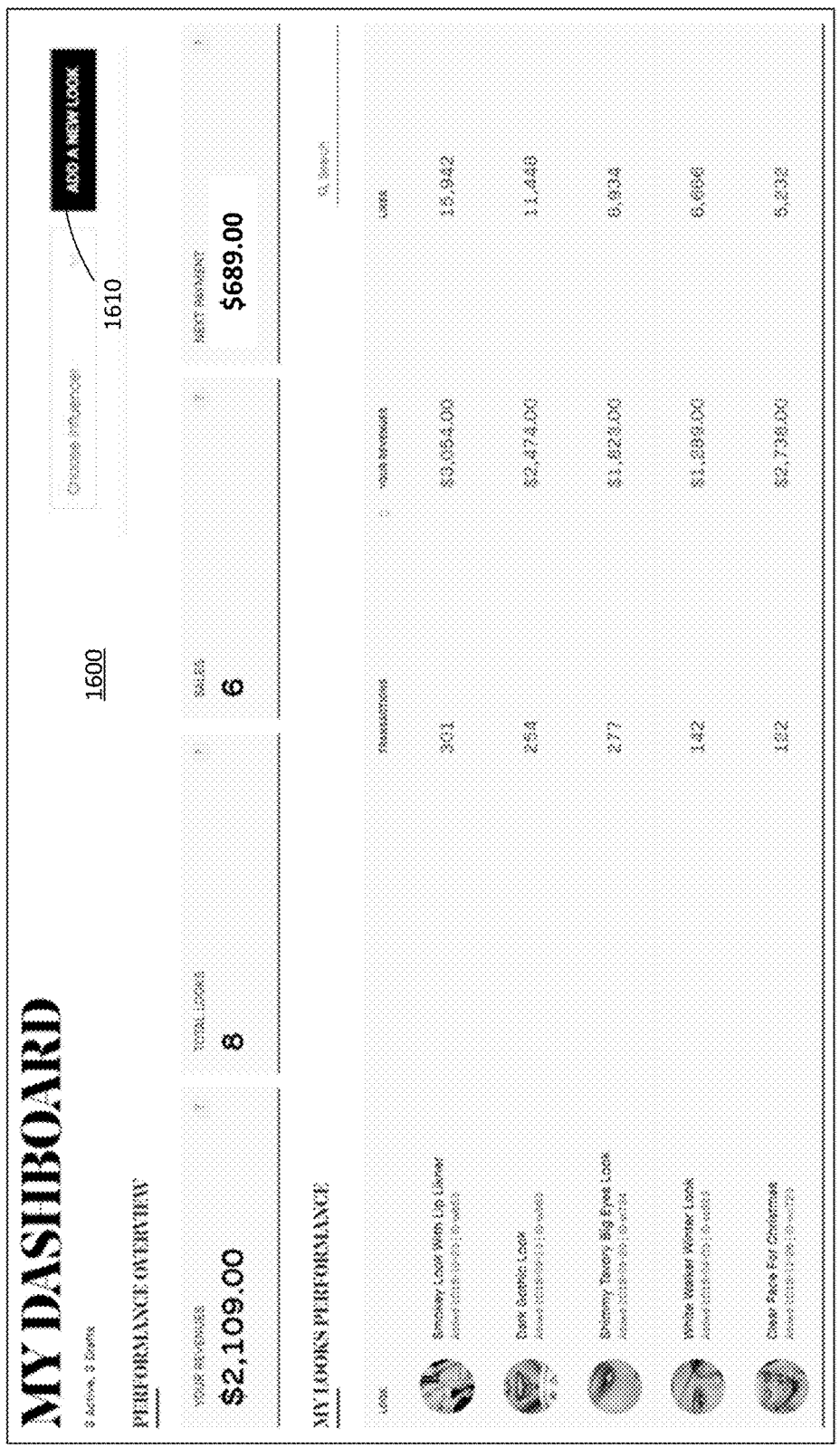
FIGS. 16A-16C provide a set of screenshots of exemplary Dashboard utility tools associated with the influencer-facing portal as implemented by the cross-platform system of the present invention.
Figure 16B:
Figure 16C:
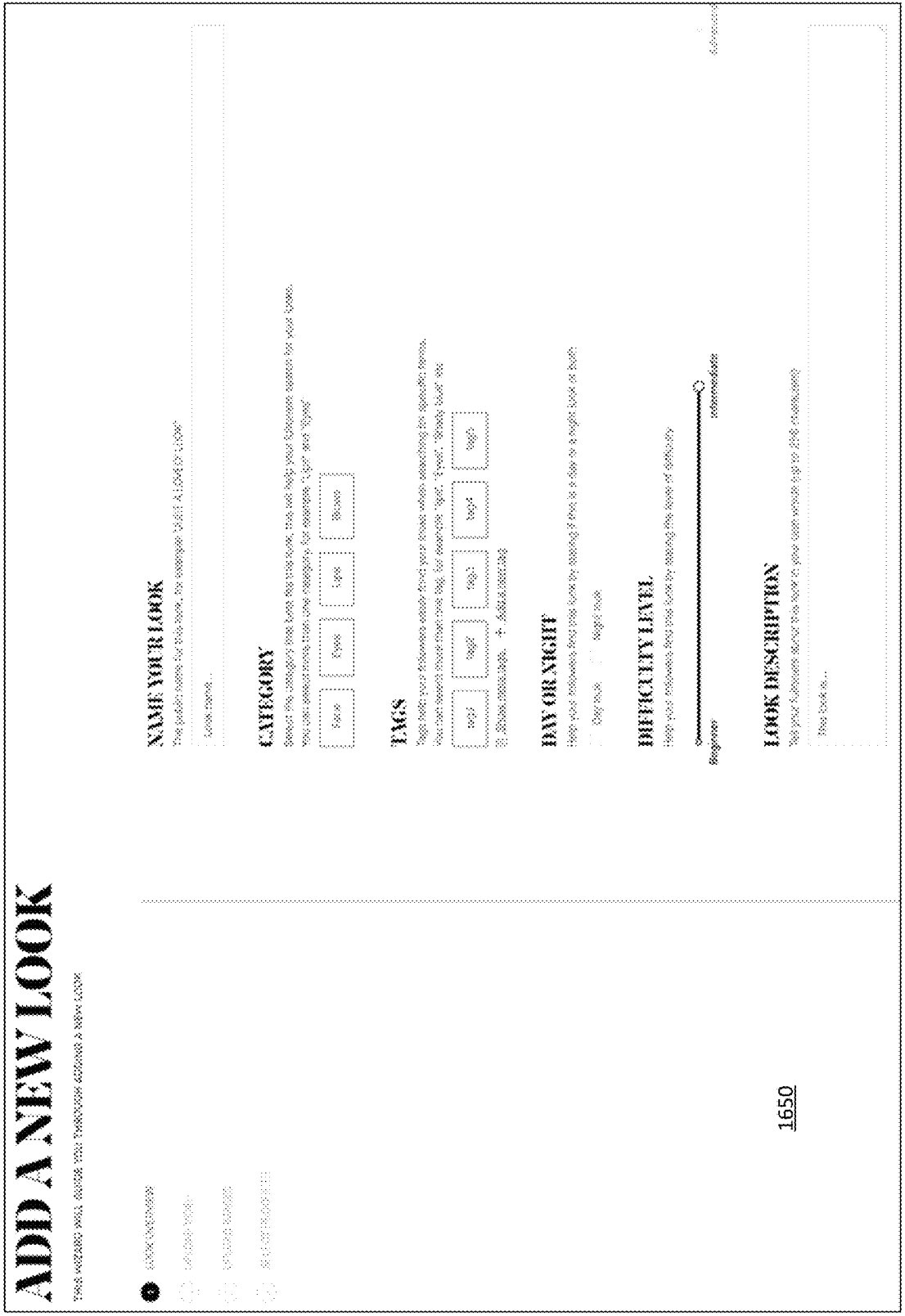

FIGS. 16A-C illustrate an exemplary influencer dashboard that displays key information related to the influencers statistics and other data associated with participation in the program. In this example, screen 1600 illustrates an influencer "My Dashboard" utility presented to an influencer enlisted in a program. Here a set of key information is presented to an influencer to track statistics and program related data. The exemplary screen shows under a section titled "Performance Review" fields of data: Your Revenues ($2,109.00), Total Looks (8), sales (6) and Next payment ($2489.00). Some or all of this data may be collected and administered via a third party, e.g., Impact Radius discussed hereinbelow. Under the "My Looks Performance" titled section, each Look associated with the influencer is shown along with number of transactions (this may be related to consumer user interactions and/or product purchases), Revenues associated with each Look and Likes associated with each Look. As shown in FIG. 16B, screen 1600 also includes sections of the Dashboard depicting "My Best Selling Products" and "My Most Loved Looks." Information included in the "My Best Selling Products" section includes Product, % of Total Revenue, Transactions, and Revenue associated with each product. Information included in the "My Most Loved Looks" section includes Look and Likes, % of Total Likes, and Revenue associated with each Look.

By selecting the user element 1610 of screen 1600, the influencer opens or navigates to screen 1650 as shown in FIG. 16C and is presented with a set of input elements enabling the user to name and create a new look for content generation and for tracking via the Dashboard utility. Here the user names the new Look and identifies a category (e.g., face, eyes, lips, and brow), a set of tags (e.g., tag1-tag5), a day or night style of the look, a difficulty level associated with the look (e.g., by use of a slider element indicating a range from beginner to intermediate to advanced), and a textual look description. From the "New Look" module of the Dashboard utility, after creating a record for the new look, the influencer may then upload video related to the look, upload images, or select products associated with the new look.

FIGS. 17-43 illustrate exemplary consumer-type or consumer-facing client-side screens generated by central server 5830 for serving and presenting to consumer remote device 5826 via a consumer (WWW-based) portal aspect of the CGCF. Consumer-type users will also go through a sign-up process to establish an account or record or persona with the central server 5830. Prior to establishing an account consumer-users may access some or all of the consumer experience. In one manner of operation, when a user first opens the mobile app, the user is presented with the log in screen. If the user already has an account with the electronic platform, the user may log in by selecting the log in option. On sign-up the user may enter personal information including name and email for their desired user account. If the user already has an account they may sign in on the log in screen using their established and selected or assigned username and password associated with their unique profile and record.

Figure 18:
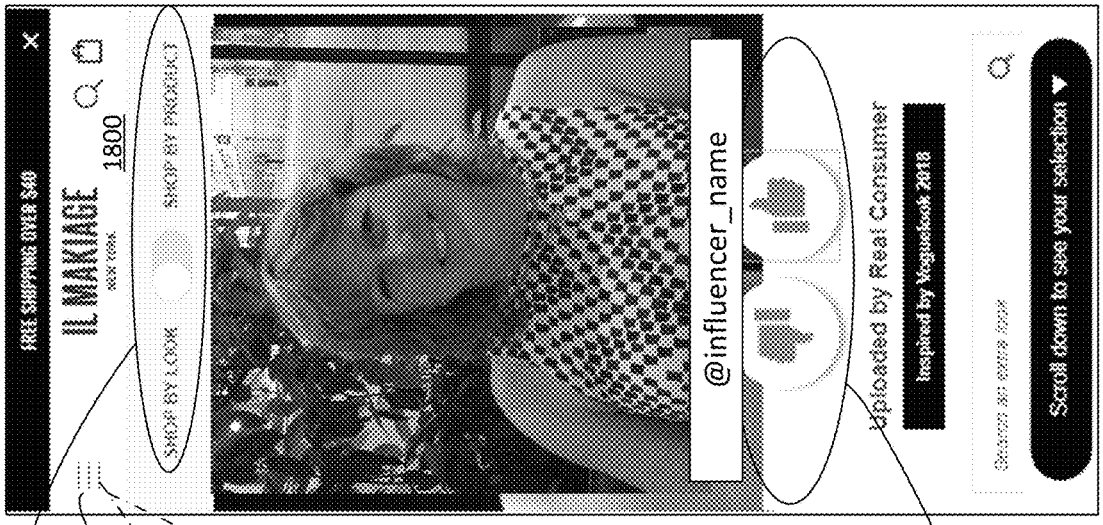
Figure 17:
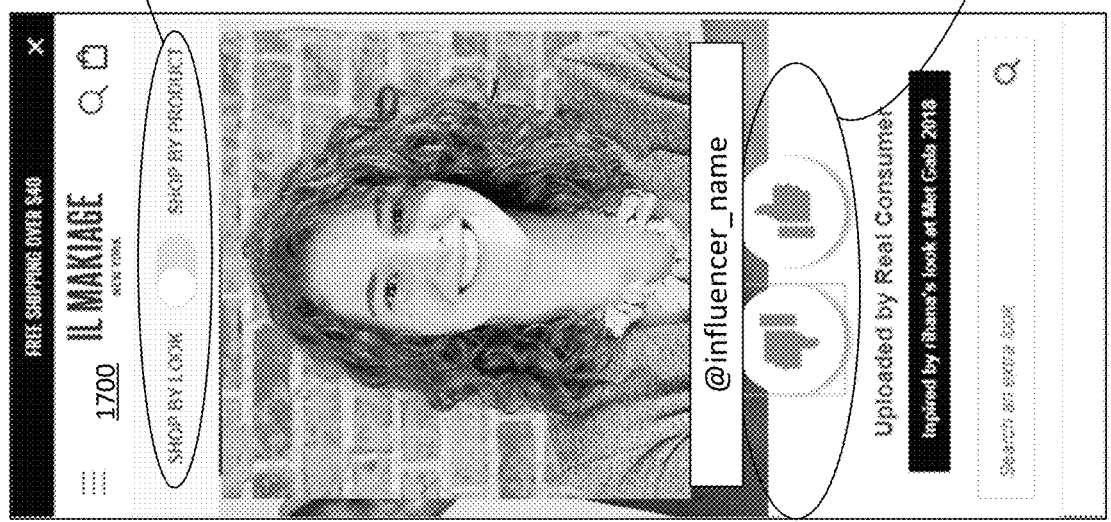

With reference now to FIGS. 17 and 18, two exemplary screen shots 1700 and 1800 of "looks" are shown as presented to a consumer user 5820 for review and consideration. As shown, a user interface element or toggle 1710 enables a user to select and navigate between experiences, in this example the two experiences are "shop by look" and "shop by product." Here the user has selected the shop by look experience and is presented with "looks" generated by influencers. A swipe left/right function may be used to allow the user to select/deselect images or looks of interest. In this example thumbs up/down are used as user interface elements 1720 to enable user interaction and track user input/feedback. A "heart" icon/element may be used to identify looks of interest to the user for future review. A user may go through a series of images/looks and select a subset of the presented images or looks for further consideration. By providing a highly interactive tool, the system of the present invention presents an enhanced user experience and achieves improved user/consumer engagement, sticky-ness to the e-commerce site, and higher sales of products. After selecting a set of looks the user can navigate, e.g., scroll down as indicated at bottom of screen 1800, to review selected looks. Although "likes" and "dislikes" are captured by user selection of thumbs up or thumbs down icons/buttons as user elements, the system may employ "next" or "skip" icons instead of thumbs down and a "heart" shaped icon for like instead of thumbs up. Also, to further enhance user engagement instead of simply using a static photo or image the screens may provide a more dynamic experience by using video snippets as the user hovers over or clicks on an image. This graphic may be moveable relative to other screen objects. In addition, a user may select user interface element 1830 to open a Look filter screen 1840, which enables a user to filter or limit Looks presented by criteria of interest. For example, a user may want to focus their search based on skin tone, e.g., light, medium, tan, or deep. The user may further refine by selecting additional elements related to features of interest such as eyes, lips, brows, face. Further, a "difficulty" may be assigned to looks or aspects of looks and the user may filter based on a desired degree or level of difficulty associated with a look or application technique.

Figure 20:
Figure 19:

FIGS. 19 and 20 show exemplary screens 1900 and 2000 showing four selected looks with links to obtain additional information about one or more of the looks or influencers. Looks may be grouped and cross-referenced for grouping by a pre-defined or definable set of parameters or criteria, e.g., grouped by influencer, category, style, and/or genre.

Figure 23:
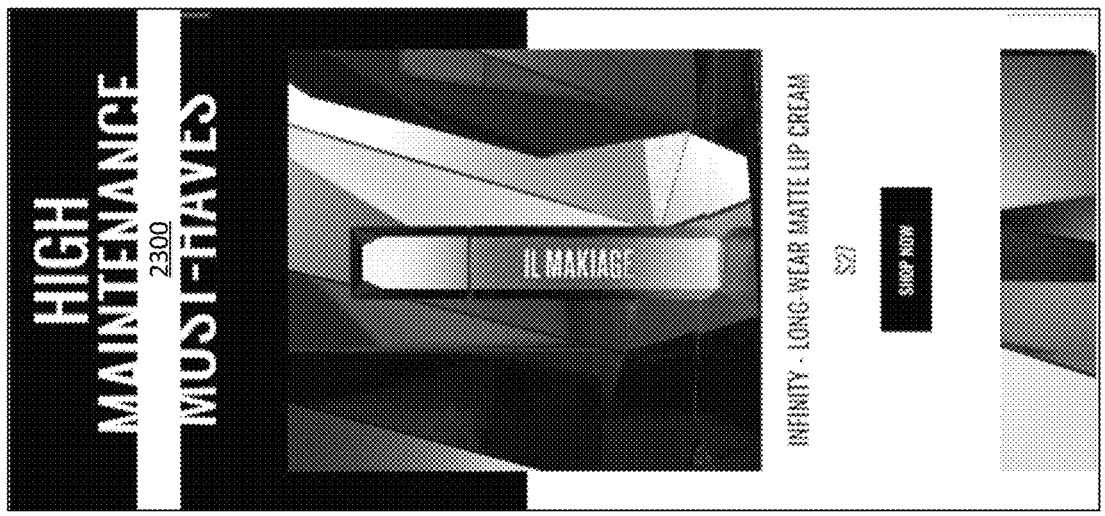
Figure 22:
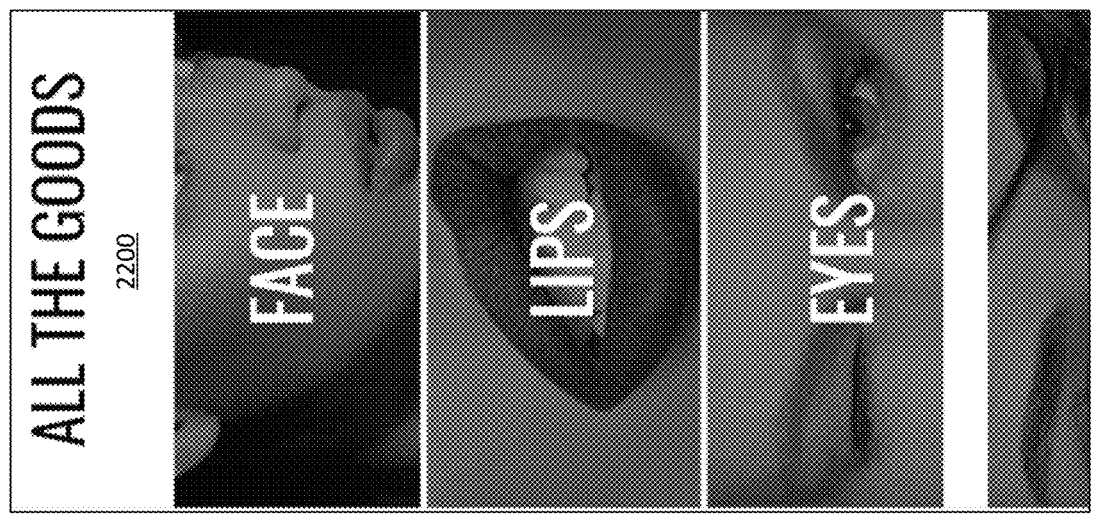
Figure 21:
Figure 25:
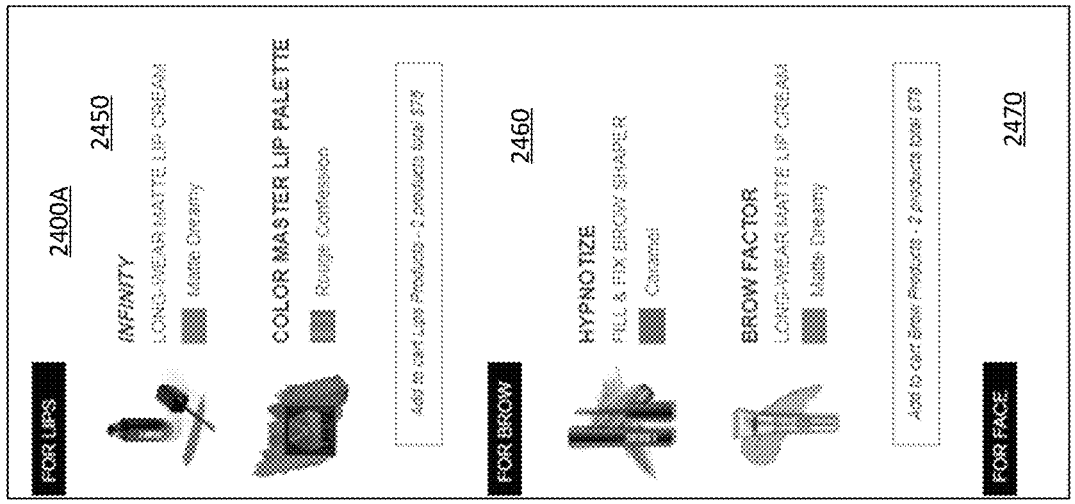
Figure 24:
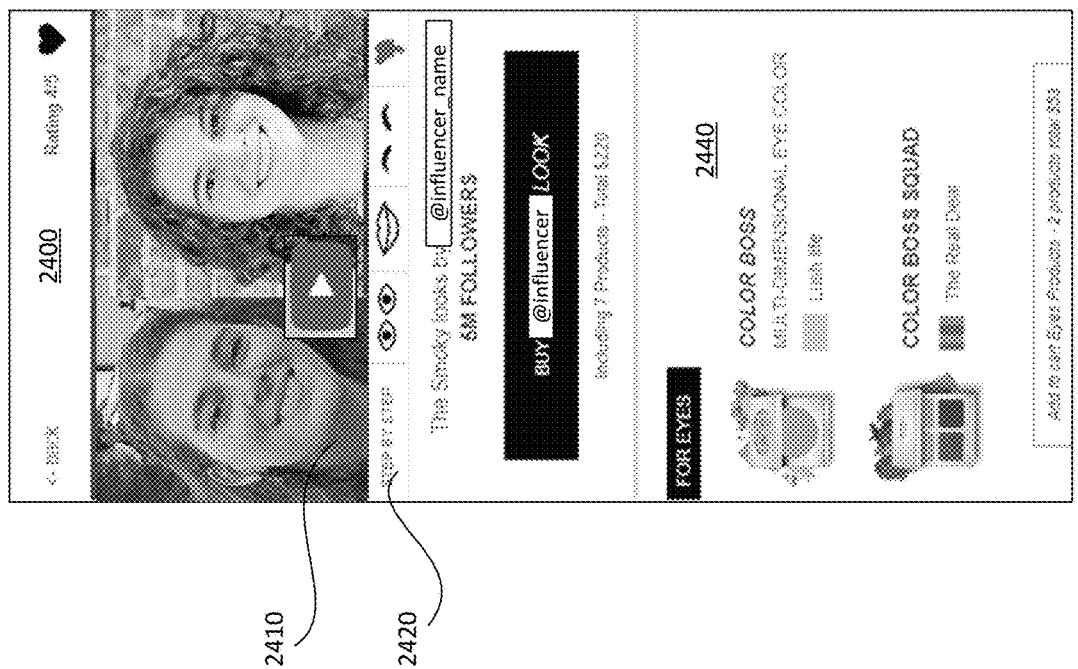

FIGS. 21-23 illustrate a set of screens 2100, 2200 and 2300 associated with an alternative consumer experience navigated to by selecting the slide or toggle element 1710 "SHOP BY LOOK . . . SHOP BY PRODUCT" to the "SHOP BY PRODUCT" position. FIGS. 17-18 were in the "SHOP BY LOOK" mode or shopping experience presented by central server 5830.

FIGS. 24-27 illustrate screens associated with presenting influencer-generated content to consumers in connection with e-commerce of related products. The screens are segmented into portions presenting content and user links to navigate through the interface/platform. As shown in screen 2400, an audio/video segment 2410 enables a user/consumer to select a video, such as hosted on central server 5830 or via a third-party platform, e.g., YOUTUBE, generated by an influencer using the utilities described herein. The video 2410 relates to an image or look selected by the consumer as illustrated in FIGS. 17-20. The video 2410 is linked to the influencer and associated image/look. Here the video 2410 starts with a before/after split screen and the video shows a step-by-step demonstration by the influencer as to how to apply the selected make-up to achieve the look as a final result. User interface elements 2420 enable a user to select a portion of the video of most interest and jump ahead to that portion of the demonstration, e.g., eyes, lips/mouth, brow, face, hair, etc. As shown in the screen 2400/2400A/2400B, the user interface is divided into several segments or portions—For eyes 2440, For lips or mouth 2450, For brow 2460, and for face 2470. As shown at screen 2400B, the look presented and the associated demonstration video are associated with assigned unique look ID or identifier "432143789." A user interface element 2610 is provided to allow a consumer user to add the face products (with respective elements for the other beauty products) to their cart or the like and shows the associated price for the products. A section 2620 may be provided to integrate a user commentary function, e.g., may include or link to a DISQUS function (https://disqus.com/), for the user to input comments about the look and/or associated products. In one exemplary manner, the user commentary may be an add-on tool to increase user engagement and power online discussions with comments.

Figure 27A:
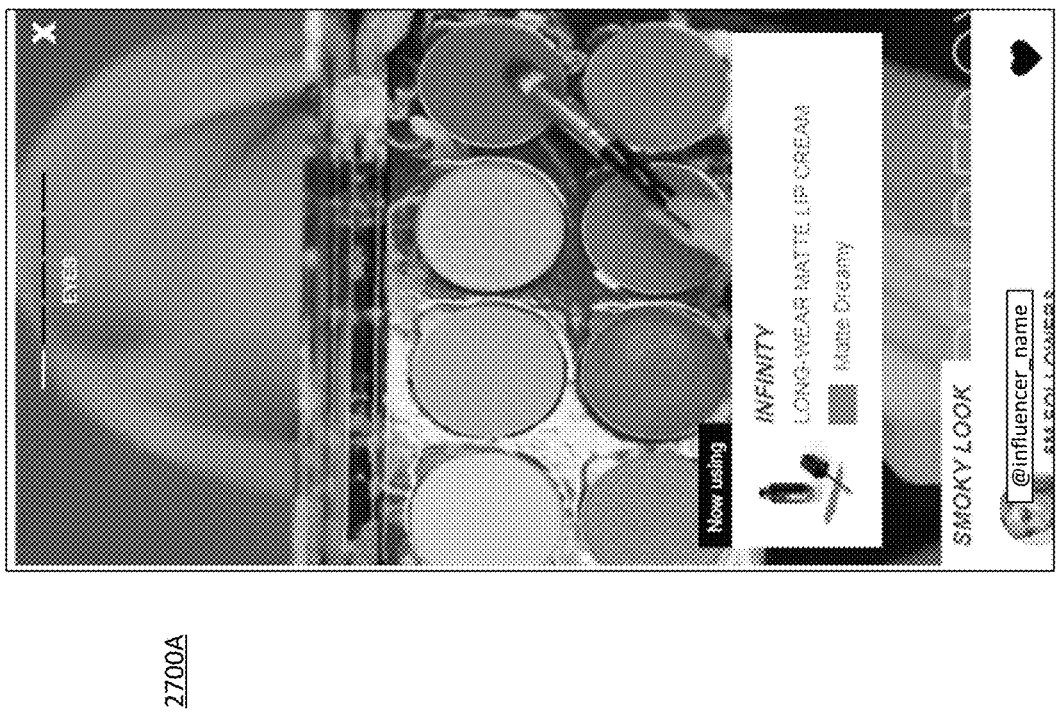

Screen 2700 shows the demonstration in progress. The content generated preferably includes segments, e.g., before, after, and full body photos, product photo/image, and demonstration video. The video may include step-by-step quick links to segments of the demonstration related to eyes, face, lips, etc. A quick-buy link 2710 is provided to enable the consumer to quickly load a shopping cart with the products used by the influencer to arrive at the look being demonstrated. Also, the set of products used to arrive at the look may be provided as shown here below the video 2410 and including "For eyes," "For lips," "For brow" and "For face." "Add to cart" buttons or elements are included in the user interface to enable the user to selectively add products associated with the look. Alternative FIG. 27A shows an exemplary screenshot 2700A illustrating a further "Now Using" video related to the product the influencer is "now using" as being viewed by the user.

Figure 28:
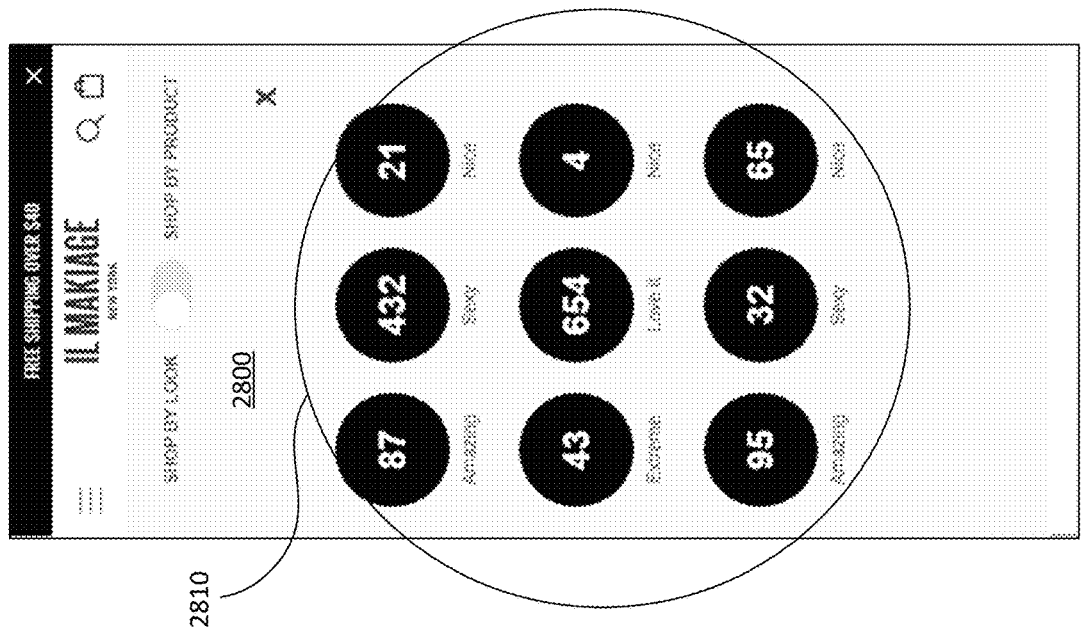

FIG. 28 illustrates an exemplary user/consumer feedback rating panel screen 2800 with active buttons 2810 adapted for user manipulation to receive user (individual) input/feedback and/or to display (collective) user thoughts related to the presented look, e.g., the numbers represent the number of users responding/selecting for each descriptor button.

FIGS. 29-35 illustrate screen navigation and responses to user actions. Screen 2900 transitions from look 2910 to look 3010 of screen 3000 upon user swiping left or right or selecting either of the thumbs up or thumbs down elements. As described above, if thumbs up is selected then look 2910 is added to the set of selected looks for the user to review. If thumbs down is selected, then the look is discarded and not included in the set for the user to consider further. Upon selecting or swiping, the system loads a new "look" 3010 to present to the user for consideration and selection/deselection. As discussed in detail above, the system utilizes logic and algorithms or tree-based tables and structures to narrow or focus the set of presented looks based upon user behaviors, stored preferences, or past history of selecting looks or products purchased.

Figure 30:
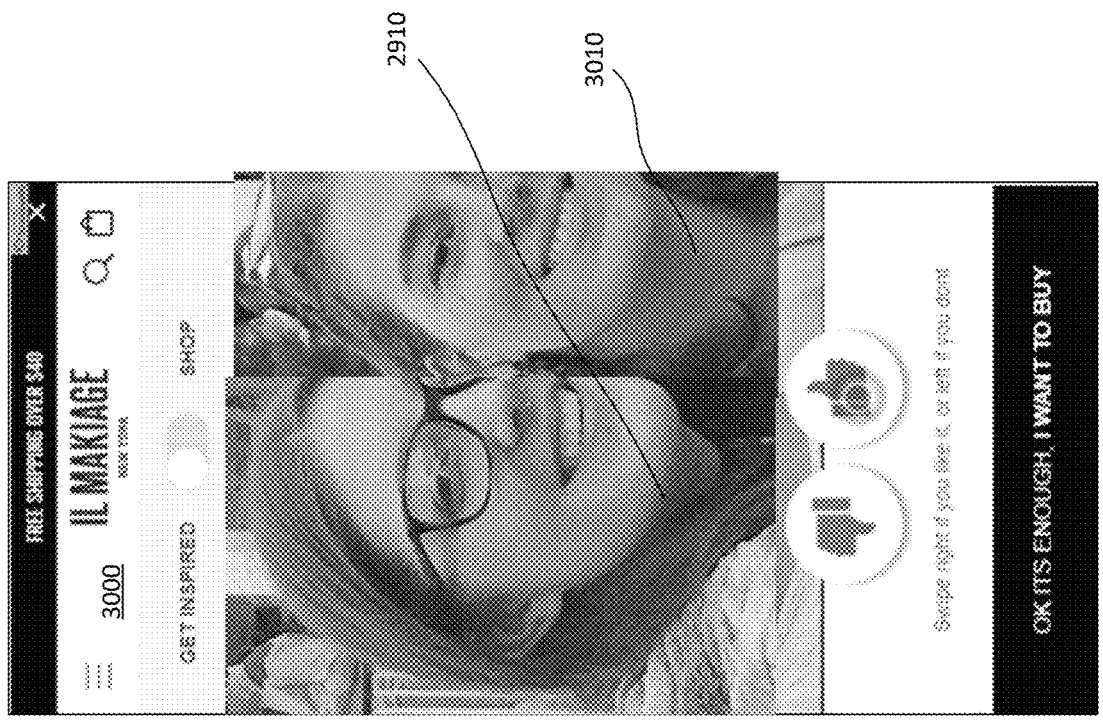
Figure 29:
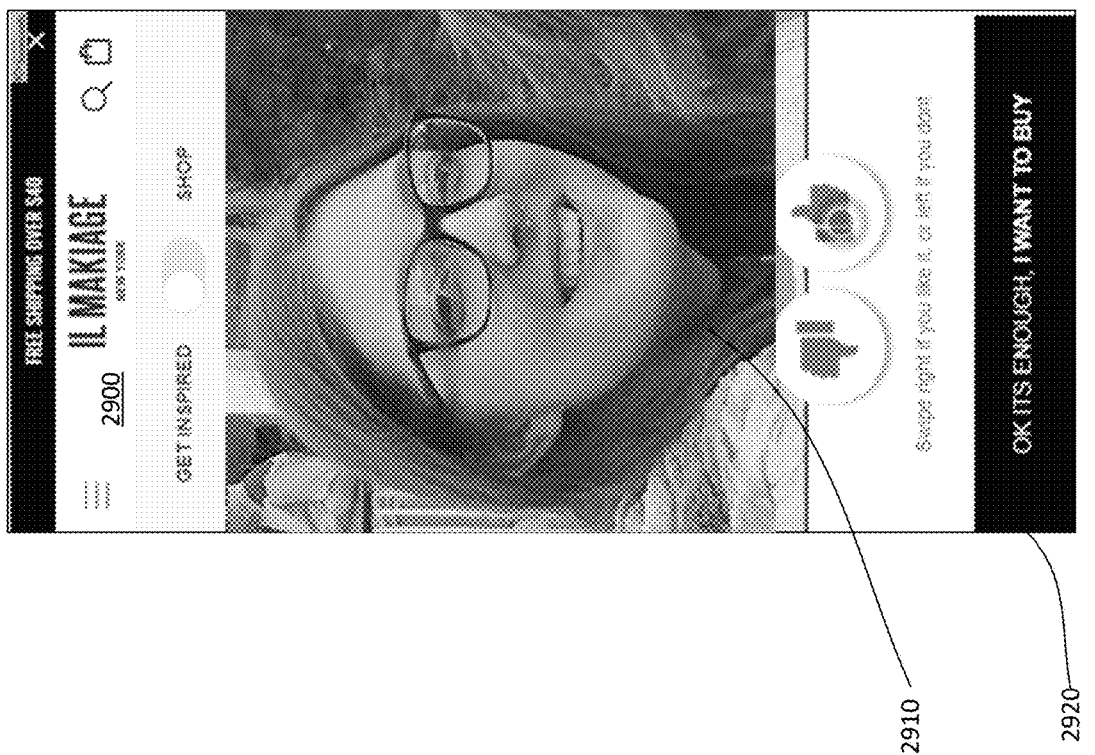
Figures 31, 32:
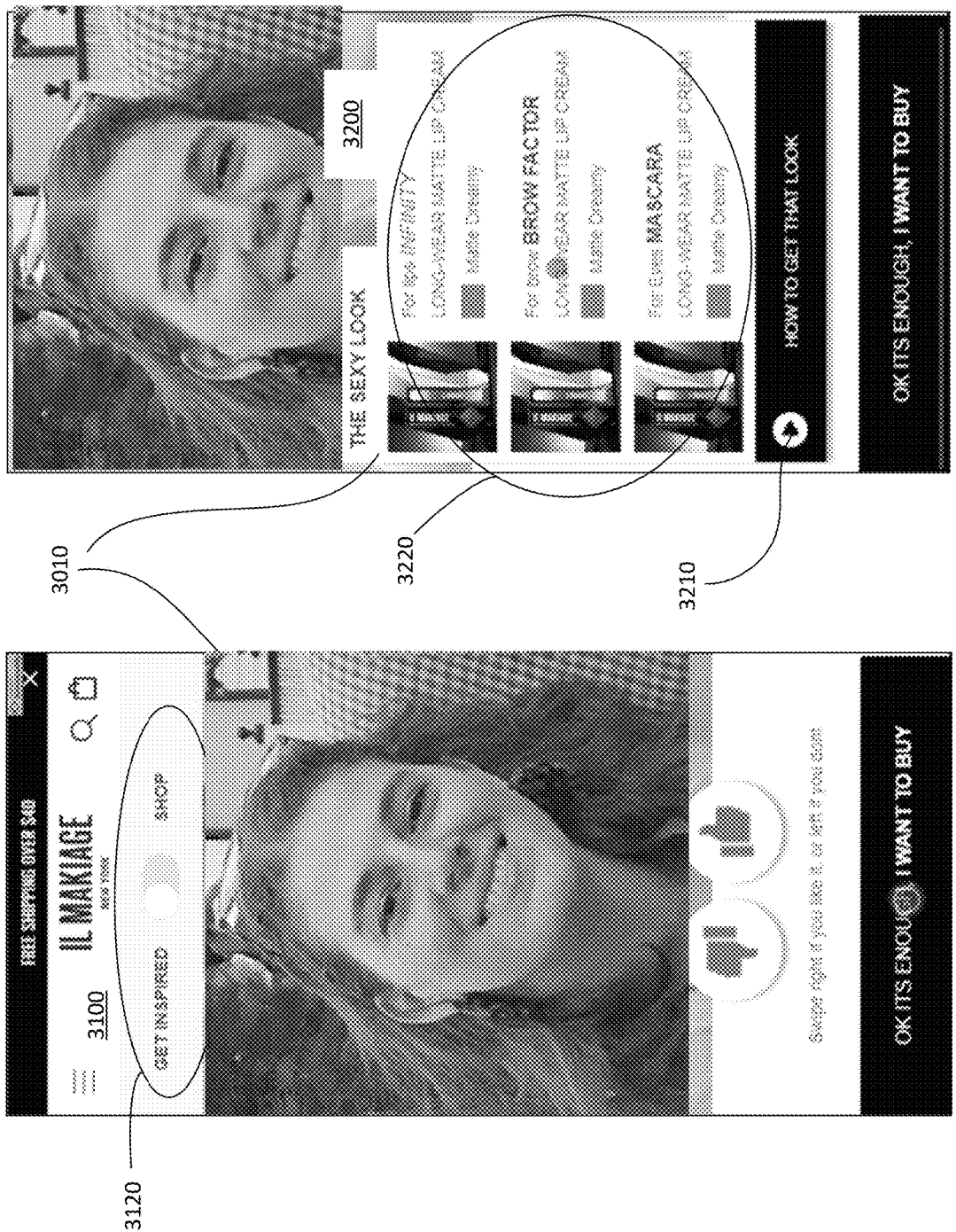

FIG. 29 illustrates screen 2900 having a button or element 2920 enabling a user to navigate directly to a purchase the products associated with the look 2910 or to a page with more information and leave the initial look presenting process. The sequence of FIGS. 29-31 illustrates the system progressing from presenting look 2910 to presenting look 3010 upon user action, e.g., swiping or selecting buttons. Each action of the user is recorded or collected for use in processes, as described above, to more efficiently and effectively present looks determined to most likely be of interest relative to other looks as stored in the looks database. Screen 3100 includes a further toggle "Get Inspired/Shop" 3120. The user may toggle between "Get Inspired" experience (viewing looks to identify products of interest) and traditional "Shop" experience to peruse products offered via the e-commerce site. In this manner a user can more efficiently transition through screens, e.g., by selecting back and forth from "GET INSPIRED" to "SHOP" and from "SHOP" to "GET INSPIRED" user interface elements 3120 to navigate from the novel "look" driven client-side experience and the traditional "SKU" driven client-side experience.

As shown in screen 3200 of FIG. 32, the user has selected a button or element (such as the "How do I get that look" button 3210 of screen 3200) revealing detailed information about the products used by the influencer to create a look 3010 (named "The Sexy Look") of interest. The user may further select from one or more product links 3220 included. The server 5830 serves up the product or look information in response to the user action.

Figure 35:
Figure 34:
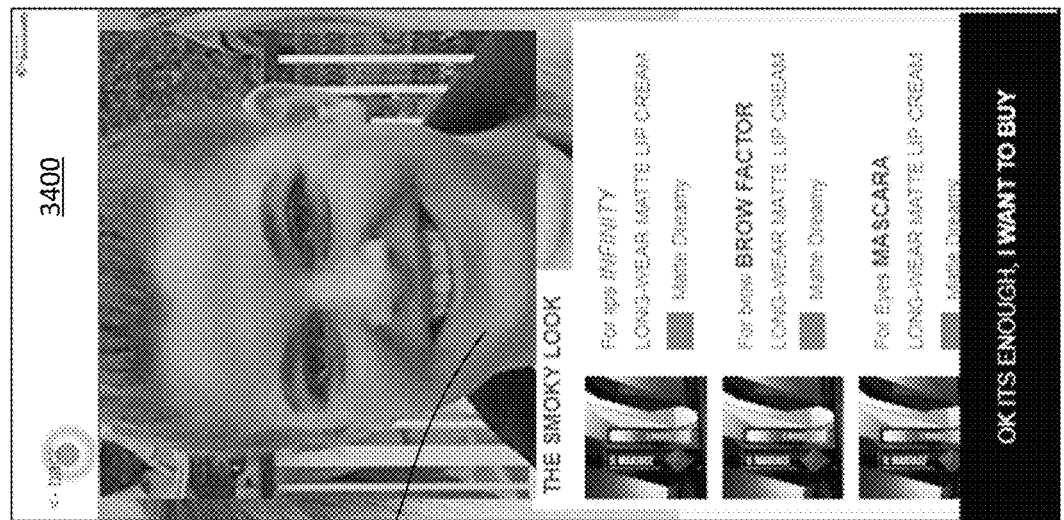
Figure 33:
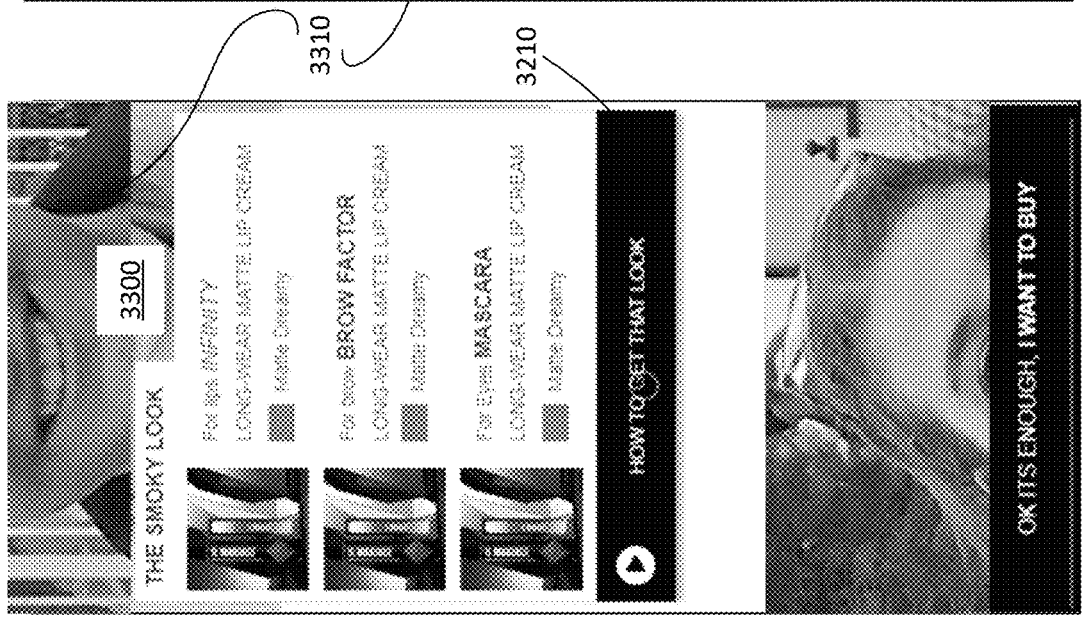

As shown in FIGS. 33-35, user interface elements provided via screens 3300, 3400 and 3500 allow the user to scroll up/down or side to side to reveal additional looks, e.g., look 3310, and associated information related to products used to arrive at that look, e.g., "The Smoky Look" 3310. By clicking on the "How do I get that look" button 3210 the user may navigate to a page including an influencer-generated tutorial or video demonstrating the chosen make-up product and the method of applying the make-up to arrive at the look, see e.g., video demonstration 2410 of FIG. 24.

Figure 36:
Figure 38:
Figure 39:
Figure 40:
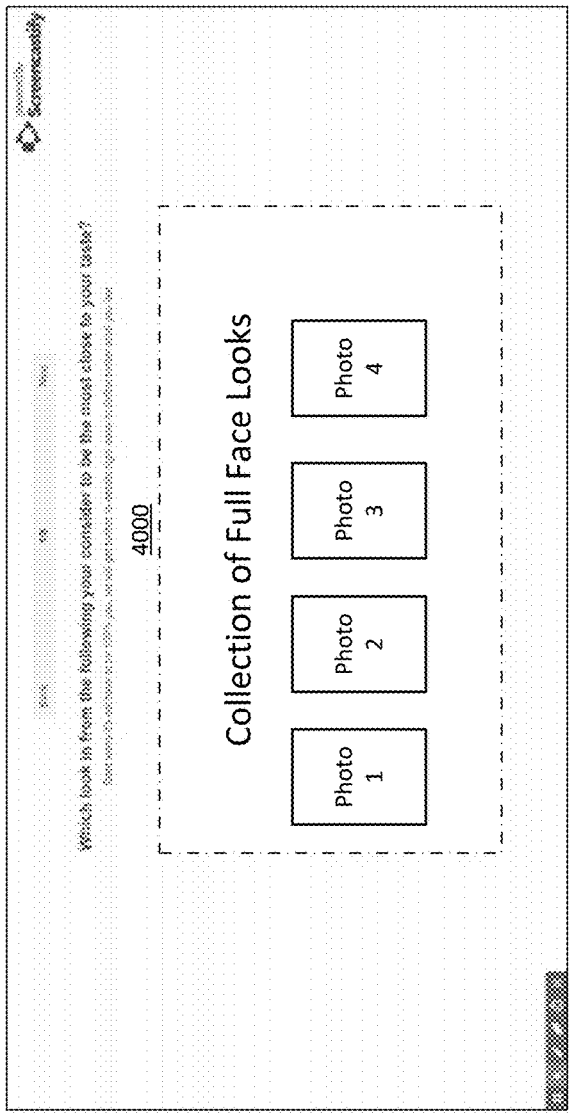
Figure 41:
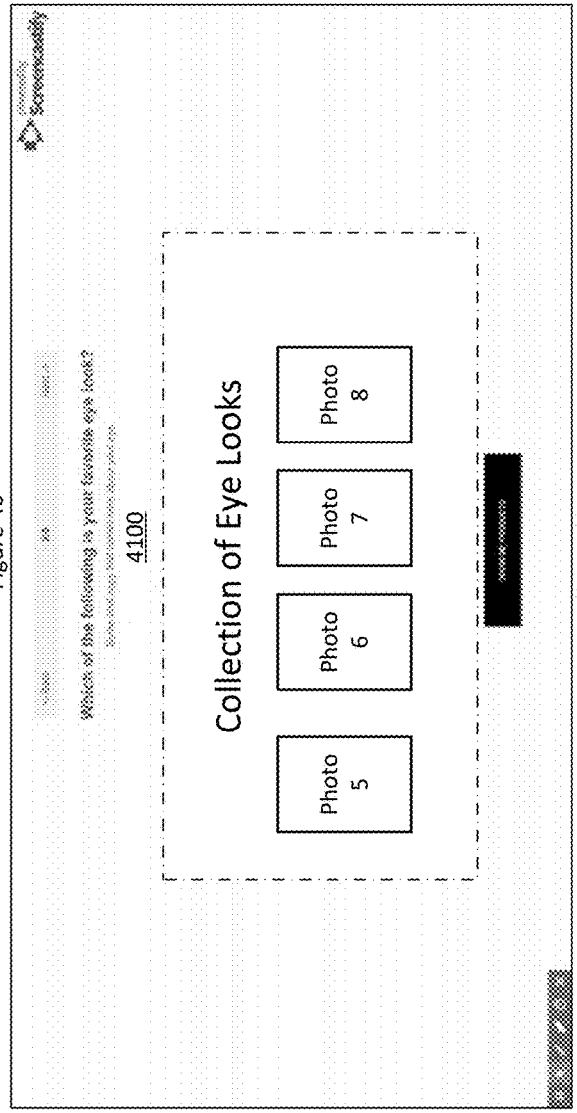
Figure 42:
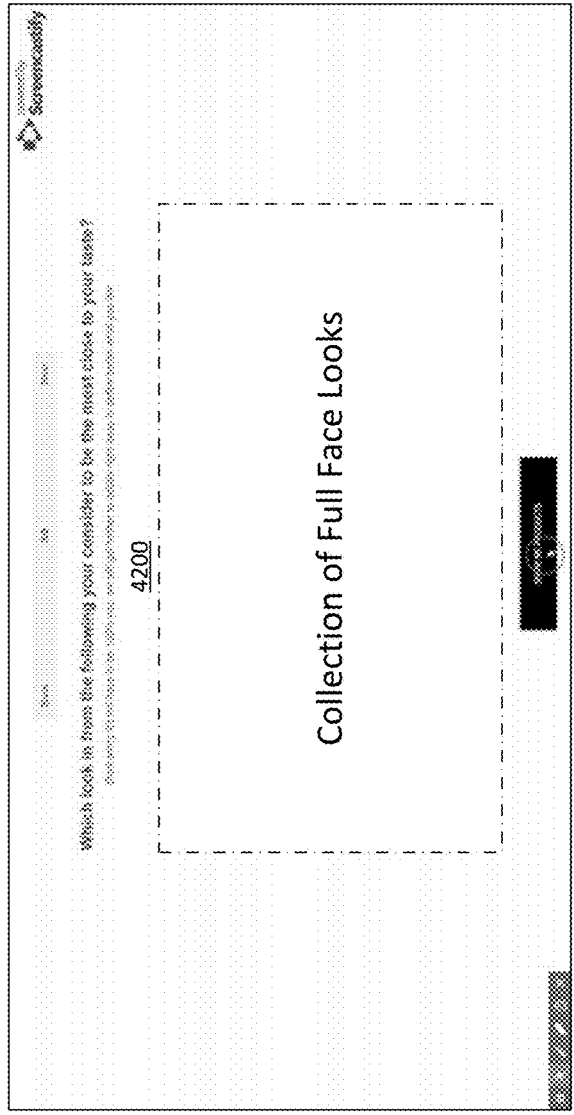
Figure 43:
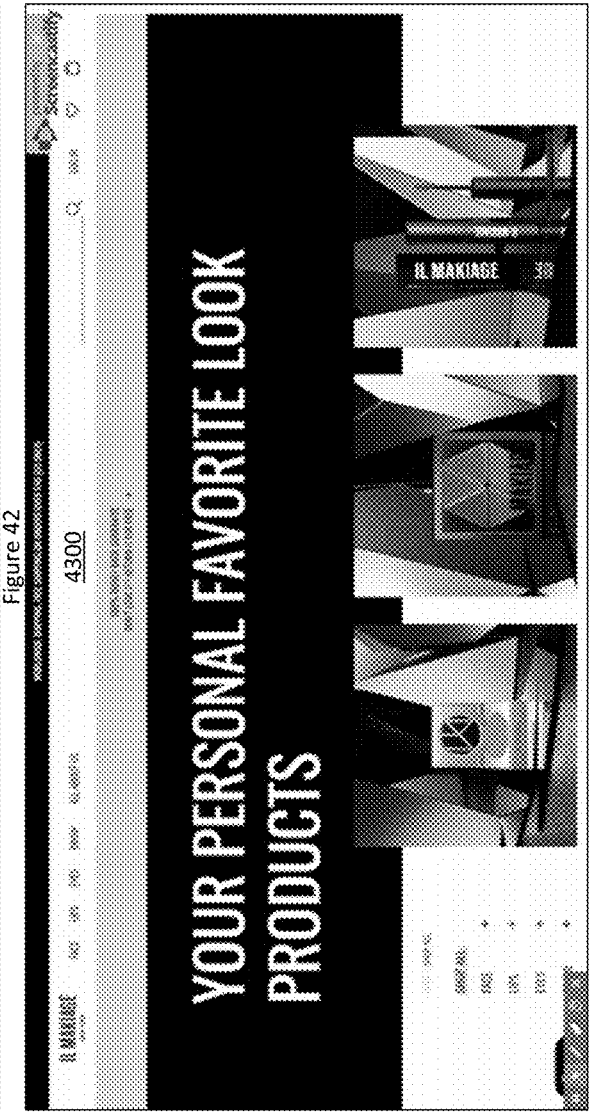

Screen 3600 of FIG. 36 illustrates a transition from the "Get Inspired" experience of FIGS. 29-35 to a "Shop" experience by the user engaging toggle 3120.

Collectively, the figures illustrate screen transitions and navigation through the "look"-based consumer experience and related functionality.

Figure 37:
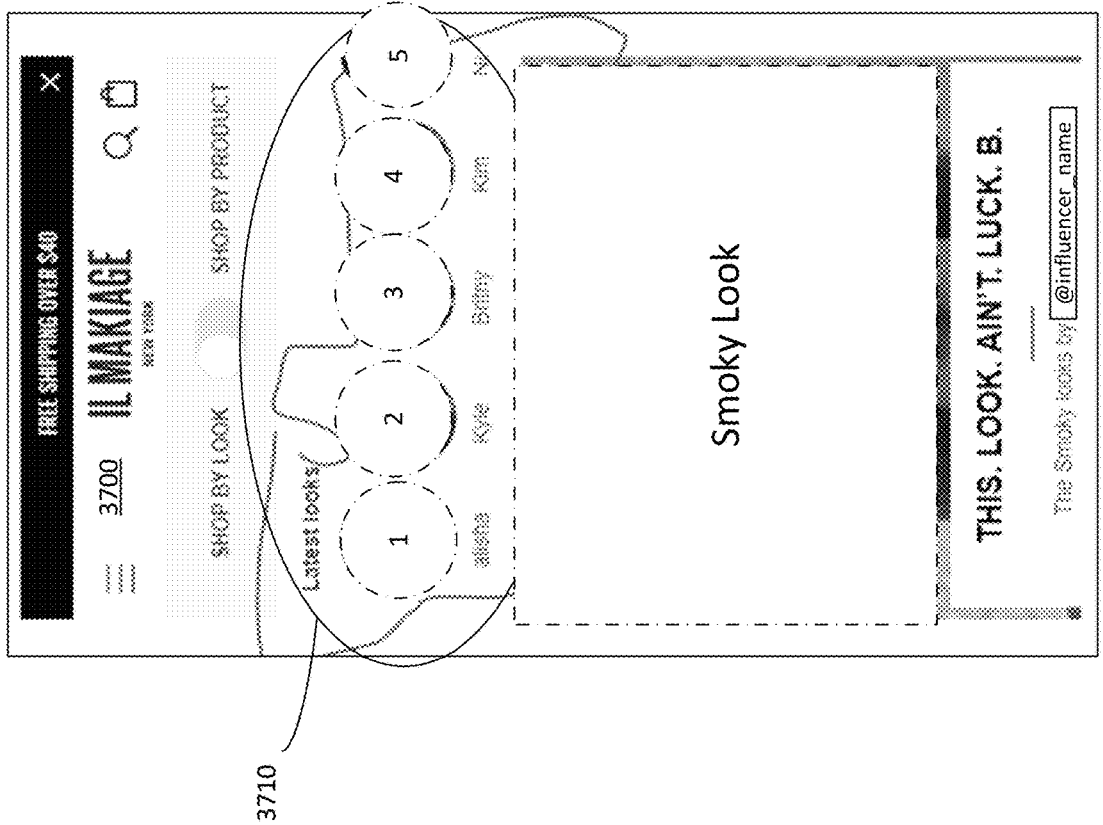

FIG. 37 shows an alternative screen shot of a user interface having an update section 3710 to present updated looks, e.g., newly added looks or newer ("fresher") versions of looks.

FIGS. 38 through 43 illustrate exemplary screen shots 3800-4300 related to navigating in a consumer-facing e-commerce experience. For example, a user may "click on" the "Get Started" button or user interface element 3820 to begin a process in which a series of facial looks and eye looks are shown for the user to select a preferred facial and eye look. The screens illustrate user interface elements for collecting user preferences or reactions to presented looks. The information may be used to further narrow looks presented by the system to the user or to a broader set of consumers. For example, a look that receives universally low ratings may be removed from the system to avoid presenting users with looks known to be disfavored. On the other hand, the system may identify and differentiate looks that receive at least a significant number of high marks but may have an overall low average rating due to an equally significant number of low marks. The system may group such looks as being of interest to certain consumers while being not of interest to another set of users. Based on user profile and prior history the system may determine whether or not to present certain groups of looks.

Directed graphs and like graphical and other approaches may be used to graphically cluster or group looks and/or products and/or consumers and/or influencers to improve the performance of the e-commerce platform. Tagging operations or the like may be used to cross-link records, associate commonality among looks or influencers or consumers or products.

Figure 44:
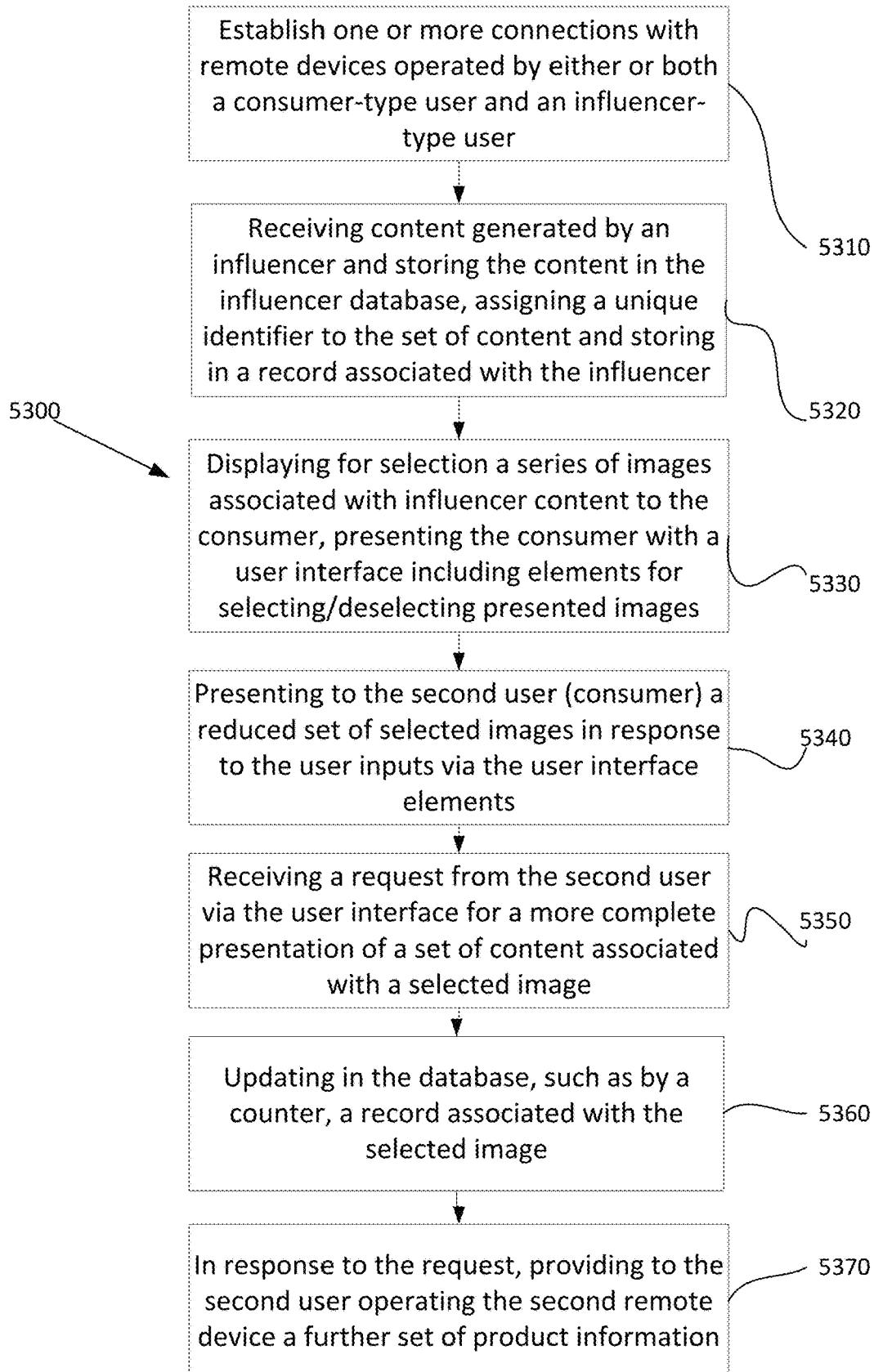
FIG. 44 provides a flow chart depicting an exemplary process for receiving "look" content from a first user via a first portal and presenting such content to a second user and processing user inputs via a second portal using the cross-platform system of the present invention.

Now with reference to FIG. 44, flow chart 5300 illustrates an exemplary method associated with the present invention for facilitating content generation and consumer engagement related to sale of goods or services. As shown, at step S310, establish a first connection between a central server and a first remote device associated with a first user, the first user being an influencer-type user; and/or establish a second connection between the central server and a second remote device associated with a second user, the second user being a consumer-type user. One or more of the steps described herein may be accomplished by the central server by a processor for executing machine-readable code stored in a memory associated with the central server. As shown at step S320, receiving from the first user, via a client-side user interface operating on the first remote device connected over a communications network with the central server, a first set of content, e.g., an image and or video posting or set of links, related to a "look" created by the first user and including one or more products; and storing the first set of content in a database.

In addition, the further step of associating the received first set of content with a unique identifier (look identifier) and storing the unique identifier in a record associated with the first user (influencer) and the first set of content (LookID #). At step S330, displaying for selection a series of images associated with a plurality of received sets of content to the second user operating the second remote device (consumer), presenting the second user (consumer) with a user interface including a set of elements for selecting/deselecting presented images. At step S340, presenting to the second user (consumer) a reduced set of selected images in response to the user inputs via the user interface elements. At step S350, receiving a request from the second user (consumer) via the user interface for a more complete presentation of a set of content associated with a selected image. At step S360, updating in the database, such as by a counter, a record associated with the selected image. At step S370, in response to the request, providing to the second user operating the second remote device a further set of product information. In this method the product information may be related to a product linked to the selected image, set of influencer-generated content and influencer (first user) record associated with the first remote device 5816. The product information may include links or other user interface elements to facilitate or enable user purchase of a presented and selected product associated with the selected image. The method may further comprise executing one or more transactions related to the sale of a selected product by the second user and/or the credit to the first user related to the selection of the image associated with the first set of content.

FIG. 45 depicts a chart 4500 showing consumer engagement statistics illustrating the ineffectiveness of existing beauty-related e-commerce facilities with comparative data. One key problem addressed by the present invention is to provide an online consumer experience that achieves improved consumer engagement that rises to or exceeds levels of engagement typically attained via brick and mortar in-store engagement. Historically, online store metrics significantly trail those of in-store metrics, specifically in the beauty market. The following statistics for beauty in-store vs. online consumer engagement demonstrate this divergence: bounce rate is 20-30% in store vs. about 50% online; time spent or duration of engagement is 15-25 minutes in-store vs. 2-4 minutes online; and conversion rate is 25-40% in-store vs. 1-3% online. The cross-platform CGCF powers a new and improved practical application of e-commerce tools to provide users with an enhanced experience to achieve heightened consumer engagement results.

In one embodiment of the CGCF cross-platform system, multiple brands, including competitive and/or synergistic brands, may be combined to present e-commerce consumers with a marketplace from which to have an expanded and consistent shopping experience. Such a marketplace may be focused on a particular segment, e.g., beauty, or may combine segments, e.g., beauty and fashion. Such a cross-platform system may involve a common central system presenting a plurality of brands or may be licensed for use and maintenance across a group of brands.

Figure 46:
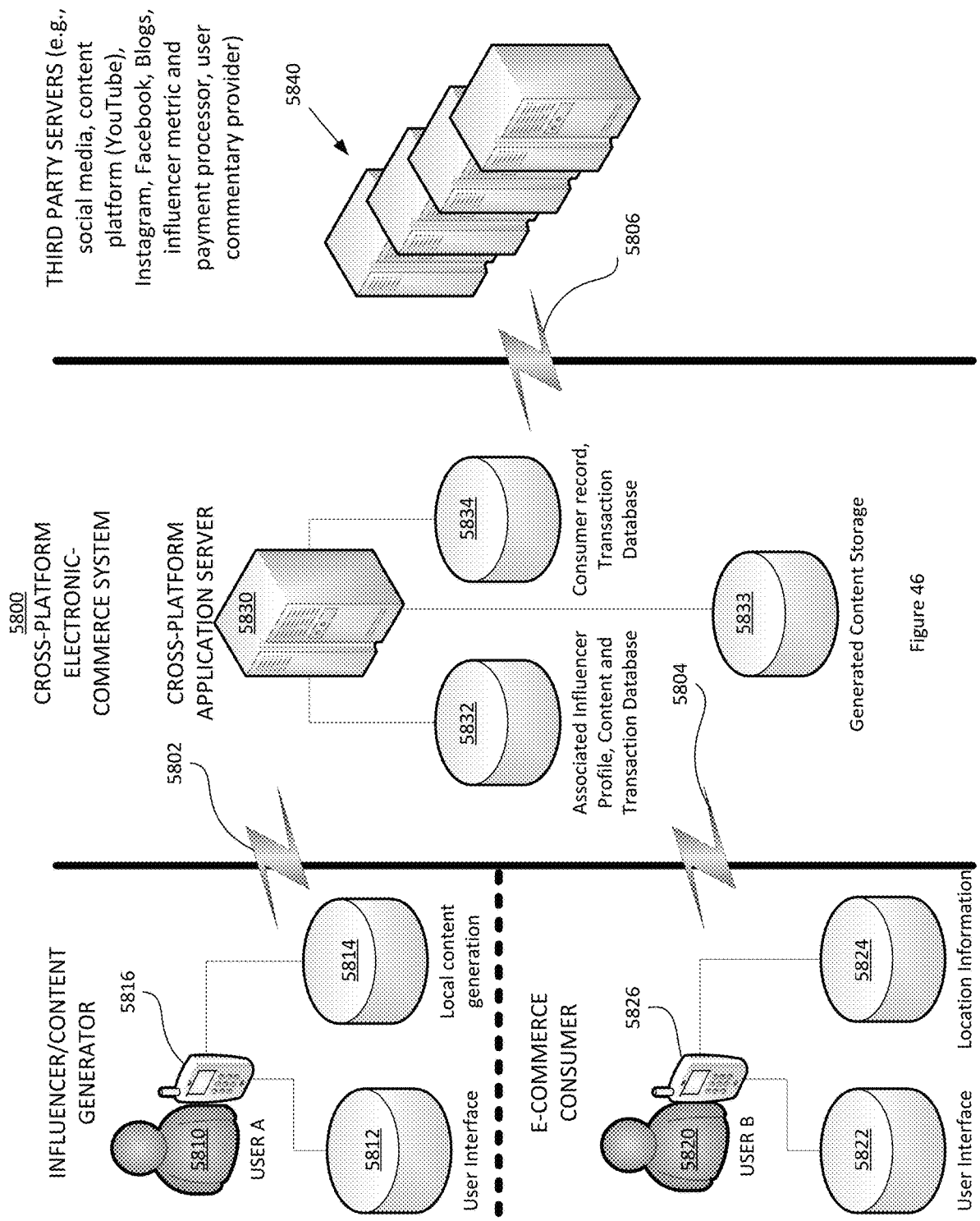
FIGS. 46-48 illustrate exemplary schematic diagrams of client-server architecture associated with a cross-platform embodiment of the present invention.
Figure 47:
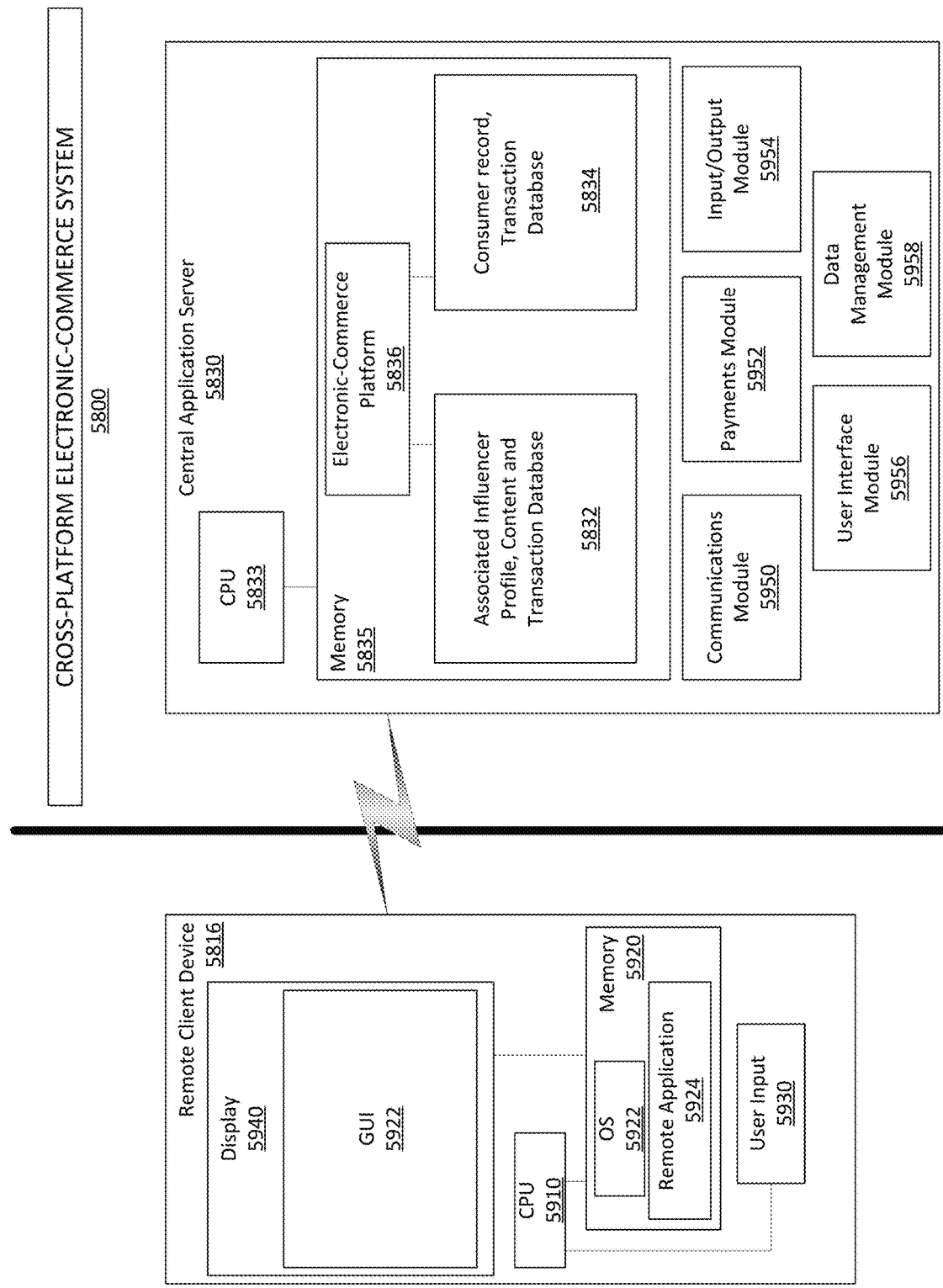
Figure 48:
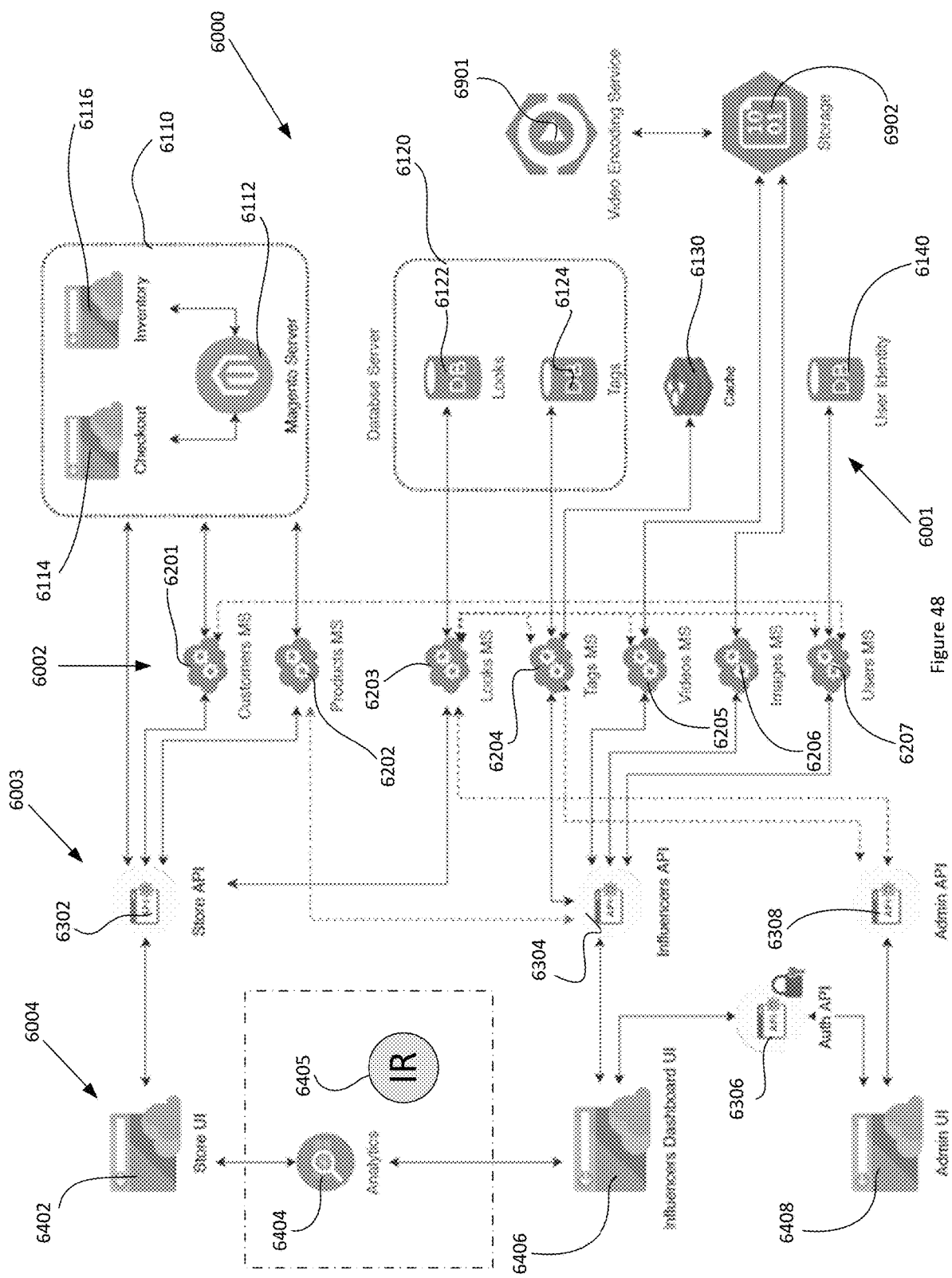

FIGS. 46-48 illustrate an exemplary embodiment of the cross-platform system of the present invention for processing the rules, utilities and modules discussed herein with respect to the modules and schema of FIGS. 1-8 and for presenting the user interfaces of FIGS. 9-43 and for collecting user input data in connection with carrying out the practical application using the algorithmic and other logical operations necessary to implement such modules and schema.

With reference to FIG. 46, an exemplary first embodiment of the present invention is depicted in a schematic network diagram illustrates how different components of the system 5800 may be connected and interoperate with one another to execute the user interface functions shown in the screenshots of FIGS. 9-43. In one manner of operation, the CGCF provides an influencer portal for interacting with influencers as content generators and for handling compensation and content management. The CGCF separately provides a consumer portal for interacting with consumers for presenting products and looks associated with products including influencer-generated looks and content and interfacing with social media and other third-party systems.

As shown in FIG. 46, User A 5810 is an "influencer-type user" operating any remote device, e.g., mobile device 5816, and in this example is a person identified as being influential and followed by potential consumers or customers, e.g., such as User B 5820. User B 5820 is a "consumer-type user" shown operating remote device 5826 (which could alternatively be a device communicating over a LAN) and is a potential customer of an entity operating the central server 5830. Each mobile device 5816 and 5826 may be a device with radio network connectivity, such as a cellular network or internet network, and an operating system capable of running Web browsers or a software application such as GOOGLE's ANDROID OS, APPLE's iOS, or MICROSOFT's WINDOWS MOBILE. User A 5810 has the remote mobile device 5816 which is capable of receiving, storing and or presenting a set of user interfaces 5812, such as received from central server 5830, and also includes local content generation capabilities on Web browser ("Web") or mobile software application ("app"), together can be call ("GUI") or other client-side applet that may be employed in connection with the electronic-commerce platform of the present invention. The GUI provides the User A 5810 with the ability to connect to the electronic platform run on the application server 5830. The electronic-commerce (e-commerce) system 5800 includes server 5830 that connects with User A 5810 and with User B 5820 and any number of other users of the electronic-commerce platform.

Users as used herein generally fall under two types of users, content-generating influencer-type users, and e-commerce consumer-type users. However, administrators or store-based company users are also "users" in the sense their personas are also involved in administering and operating the CGCF. As shown in FIG. 46, (Influencer/Content Generator) User A's 5810 mobile device 5816 comprises local content generation feature 5814 that communicates with the central application server 5830 via a communications network, e.g., the Internet connected by one or more wired or wireless networks. User B 5820 also has a mobile device 5826 which comprises a user interface feature 5822 associated with the app and a set of information 5824. The application server 5830 receives via an input, such as uploading image or video or text files or links, content generated locally by User A 5810. Content generated remotely may be stored centrally via server 5830 and Generated Content Storage 5833. Locally, information input and content generated by User 5810 may be stored at store 5814 and also at the influencer database 5832 and generated content database 5833, including influencer records.

Unique identifiers may be assigned to one or more files uploaded as influencer-generated content. The consumer database 5834 is used to store consumer related information and records such as user preferences, e.g., content related to selected or otherwise identified content of interest. In this manner influencer-generated records and content may be linked to consumer records and files. The central server may communicate with third-party servers 5840, e.g., social media, content platforms, YOUTUBE, INSTAGRAM, FACEBOOK, Blogs. The central server 5830 and one or more of databases 5832, 5833 and 5834 may comprise data and electronic transaction services and execute and store transaction-related data related to consumer-type users and influencer-type users.

With reference now to FIG. 47, a block system diagram illustrates the CGCF as a cross-platform electronic commerce system 5800 having a remote device 5826 in communication over a wireless network with application server 5830. The mobile device 5826 comprises a processor 5910, memory 5920, display 5940, and user input 5930. The user input 5930 may be incorporated in the display 5940 in the form of a touch screen display. The display 5940 provides a graphical user interface 5922 generated by the mobile application 5924. The mobile operating system 5922 coordinates the constituent components of the mobile device 5826 and the software stored in the memory 5920. The app 5924 which is shown running on the exemplary mobile device 5826 is interacted with by the users through the graphical user interface 5922. The mobile device 5826 is in electronic communication with one or more application servers 5830 over a network connection. The application server 5830 comprises one or more processor 5833 and a memory 5835. The electronic-commerce platform 5836 runs on the server 5830 and is stored in the memory 5835 and is executed by the processor 5833.

The E-Commerce System 5800 may include or have access to one or more databases, and electronic-commerce platform 5836 may access and store data on one or more databases including the influencer database 5832 and the consumer database 5834. The application server 5830 may further comprise a communications module 5950, a payments module 5952, an input/output (I/O) module 5954, a user interface module 5956, and a data management module 5958. The communications module 5950 is adapted to manage communications between one or more mobile devices and the application server 5830. The communications module 5950 may also be adapted to provide a user interface to the mobile device 5826 as generated by the user interface module 5956 and may communicate and send data feeds to external sources, which may also employ I/O module 5954.

The payments module 5952 may be configured to facilitate payments for products from consumer-type users or payments to influencer-type users related to content generated and presented as further described herein and may also communicate with third-party servers or systems to facilitate payments or transactions. The input/output module 5954 is configured to receive inputs from mobile devices, third-party servers, and other systems and devices and is further configured to manage these inputs or to route the inputs to the appropriate device, module, or database. The data management module 5958 manages the data stored in the Associated Influencer Profile, Content and Transaction database ("Influencer") 5832, the Consumer record, Transaction Database ("Consumer") 5834, and other data stored on the application server 5830. The communications module 5950, payments module 5952, input/output module 5954, user interface module 5956, and data management module 5958 may also be configured to perform one or more functions performed by the one or more of the other modules to provide stability or redundancy to the system. Additionally, the communications module 5950, payments module 5952, input module 5954, user interface module 5956, and data management module 5958 may be configured to perform any one or more of the other functions of the system of the present invention as described hereinabove.

In accordance with one manner of operating the system of FIGS. 46 and 47, system 5800 facilitates content generation and consumer engagement related to sale of goods or services. The system 5800 includes interacting with a first remote device 5816 associated with a first user 5810, the first user being an influencer-type user. The system 5800 includes interacting with a second remote device 5826 associated with a second user 5820, the second user being a consumer-type user. The system 5800 is configured to support and interact with a plurality of users including a plurality of influencer-type users (e.g., first user 5810) and a plurality of consumer-type users (e.g., second user 5820). The system 5800 includes a central application server 5830 having a processor and a memory, the memory comprising computer executable code that when executed by the processor transforms the computer into a special purpose machine/system. The system 5800 is adapted to receive from the first user, via a client-side user interface operating on the first remote device 5816 connected over a communications network with the central server 5830, one or more sets of content over a single session or multiple sessions. The sets of data related to "looks" created by the first user (influencer) and related to a set of products associated with the entity operating the E-Commerce system 5800. For example, a first set of content. The exemplary first set of content may be, e.g., an image and or video posting or set of links related to a "look" created by the first user and including one or more products. The system 5800 includes a database 5832 for storing the first set of content, and all such sets of content, and adapted to associate the received first set of content, and all such sets of content, with a unique identifier (look identifier) and store the unique identifier in a record associated with the first user and the first set of content, as well as each such set of content.

The system 5800 includes means for generating user interfaces for display at the second remote user (consumer) device 5826 for selection a series of images associated with a plurality of received sets of content to the second user operating the second remote device. The system 5800 is further adapted to present the second user with a user interface including a set of elements for selecting/deselecting presented images ("looks"); present a reduced set of selected images in response to the user inputs via the user interface elements. The system 5800 is further adapted to receive a request from the second user via the user interface for a more complete presentation of a set of content associated with a selected image. The system 5800 is further adapted to update in the database, such as by a counter, a record associated with the selected image. The system 5800 is further adapted to, in response to the request, provide to the second user operating the second remote device a further set of product information. The product information being related to a product linked to the selected image, set of influencer-generated content and influencer (first user) record associated with the first remote device. The product information may include links or other user interface elements to facilitate or enable user purchase of a presented and selected product associated with the selected image.

The system 5800 may be further adapted to facilitate one or more transactions related to the sale of a selected product by the second user and/or the credit to the first user related to the selection of the image associated with the first set of content. The first and second remote devices may be PC-type machines or may be mobile-type devices, e.g., smart phones, PDAs, tablets or the like.

The system of the above embodiment may further comprise a communications interface for establishing connection(s) with one or more third-party platforms or services, including social media services (e.g., INSTAGRAM), content delivery services (e.g., YOUTUBE), private websites, and blogs. Such third-party platforms or services may also be used in connection with obtaining influencer-type user generated content and/or presenting product related content to consumer-type users and/or consumer-type user content posting via one or more user interfaces served to the client-side remote devices during an online session. Blogging platform refers to a content management system, service or application that facilitates creation of web pages for publishing content and may involve website builders like WIX, blogging applications like WORDPRESS, or simplified blogging software like TUMBLR.

With reference now to FIG. 48, an exemplary embodiment of the present invention is depicted in a schematic system diagram which illustrates how the different components of the system 6000 may be connected and interoperate with one another to execute the user interface functions shown in the screenshots of FIGS. 9-43. The system 6000 comprises a storage and processing layer 6001, a microservices layer 6002, an application programming interface ("API") layer 6003, and a user interface ("UI") layer 6004. The system 6000 provides an application to a remote end user accessing the system 6000 through a remote access device such as a mobile device or computer. The user interacts with the system 6000 via the UI layer 6004. The application and services provided by the system 6000 may comprise some or all of the elements of the system 6000 and may be presented to end users as a unified application wherein the constituent elements of the system 6000 are integrated into a user-facing interface or application.

The storage and processing layer 6001 comprises an e-commerce server 6110, a database server 6120, a data cache 6130, and a user identity database 6140. The storage filesystem 6902 and the video encoding service 6901 may be part of the system 6000 or may be provided by a third-party service.

The e-commerce server 6110 comprises a Magento server 6112 which may generate and process a checkout system 6114 and an inventory system 6116. Magento, which runs on Magento server 6112, is an e-commerce platform built on open source technology which provides a flexible shopping cart system, as well as control over the look, content and functionality of the user experience through the store UI 6402. The Magento server 6112 in the e-commerce server 6110 provides for the handling and management of transactions, payment, inventory, product catalog, customers, loyalty information, product orders, fulfillment, pricing, and promotions. The checkout system 6114 and inventory system 6116 are managed by and are in communication with the Magento server 6112. The checkout system 6114 and inventory system 6116 comprise the user interfaces for the products ordering and checkout process as well as the inventory management processes as displayed through the store UI 6402 and admin UI 6408.

The database server 6120 comprises one or more databases for storing data used by the system 6000. The database server 6120 manages the looks database 6122 and the tags database 6124. The looks database 6122 stores the "looks"

generated by influencers as a set of look objects within the database and the tags database 6124 stores a set of tag objects. Tag objects have a one-to-many relationship with the look objects in the looks database 6122. For example, one look object may be related to or associated with many tag objects (i.e., one look may have many tags). Tags objects are used as metadata for look objects, products, images, and other data items in the storage and processing layer 6001. The tag objects may be used for identifying content and for presenting content to users and are used in data analytics to identify trends and other information from stored data. Tag objects are content descriptions or properties of other data objects in the system 6001 and are added by an influencer type user or otherwise and are validated by an administrator type user. Cache 6130 enhances performance of the CGCF to provide faster response times when accessing the various record files and data stored in the databases.

The user identity database 6140 is used to store information for all users of the system 6001. The user identity database 6140 may store authentication credentials, usage data, profile data, user preferences, and user transaction data. Different user and user profile types are managed and stored by the user identity database 6140 and comprise different information based on the user type. For example, an administrator type user may have a different set of data compared to a store customer type user or an influencer type user. In one embodiment the CGCF includes three key user types—Admin/Store (retail), Influencer and Customer. The CGCF stores contact details about the users including email, address, username, and basic account information data. Users who are of type Influencers or Customers/(Personas) will have extra info about them in separate tables, so Influencer user type will have data about their social accounts, profile images, beauty info (for example only—skin type, skin tone, etc.). Customer user type will have other data, like preferred Looks, wish list of Looks and products and more.

The video encoding service 6901 may be a third-party video encoding provider, such as ENCODING.COM, or may be a server running a video encoding application that is part of the system 6000. Storage 6902 is a file system storage of unprocessed video files before they are decoded or processed by the video encoding service 6901. A copy of original videos are passed from storage 6902 to the video encoding service 6901 to process (e.g., decode) the videos for delivery as content to one of the user interfaces in UI layer 6004. For example, the decoding by the video encoding service 6901 may comprise processing the videos in storage 6902 for an appropriate file format, phone or device compatibility, communications bandwidth, or bitrate.

The microservices layer 6002 provides an interface between the API layer 6003 and the data and processing layer 6001. Microservices ("MS") are a modular collection of loosely coupled services that communicate with one another and with other systems to fulfill a goal. The microservices in the microservices layer 6002 are self-contained functions with separate interfaces and internal components that handle separate tasks in the layered architecture of the system 6000. The microservices layer 6002 comprises the customers MS 6201, the products MS 6202, the looks MS 6203, the tags MS 6204, the videos MS 6205, the images MS 6206, and the users MS 6207. Each microservice in the MS layer 6002 handle a task and/or data associated with that specific microservice. The microservices in the MS layer 6002 are programs running on a Docker container. All containers for the microservices in the MS layer 6002 are run on a centralized server instance in the system 6000.

Generally, the user interfaces in the UI layer 6004 interact with an API gateway in the API layer 6003 which then sends requests to the privately hosted microservices in the MS layer 6002 which handle the requests and communication with the servers and data in the storage and processing layer 6001.

In the storage and processing layer 6001, two primary assets are the e-commerce server 6110, specifically the Magento server 6112 (store), and the database server 6120, specifically the looks database 6122. The microservices in the MS layer 6002 work as effective computer services to pass information and enable interaction between the two assets, i.e., the e-commerce server 6110, e.g., the Magento server 6112 (and related databases, e.g., products DB), and the database server 6120, e.g., looks database 6122. Each microservice in the MS layer 6002 may be considered as representing a different business entity or function within the system 6000. For example, the tags MS 6204 is a logical service for handing actions of a tag object stored in the tags database 6124. The tags MS 6204 may handle requests for access to, modification of, creation of, association of, and other actions related to tag objects. Similarly, other microservices in the MS layer 6002 process requests and functions for data, functions, or information related to the specific microservice. As represented in FIG. 48, interaction of Microservices layer 6002 operated in connection with the CGCF, and which client consumes them, includes the following Microservices: 1. Customers MS—serves as interaction with Customers DB (Name, wish list, cart) and controls the customer's Business Logic (BL) (e.g., integrates with Magento's CRM); 2. Products MS—serves as interaction with Products DB (Name, Stock, Variants, category) and controls the products BL (e.g., accesses the catalog from Magento servers); 3. Looks MS—serves as interaction with Looks DB (Name, look's products, look's influencer/creator, look's media—images and videos) and manages the BL of the Looks entities; 4. Tags MS—serves as interaction with Tags DB (names), Tag's cache and manages the BL of the tags entities; 5. Videos MS—serves as interaction with a video storage (which uses encoding service), video uploads and other video services; 6. Images MS—serves as interaction with an image storage and manages images uploads and other image services; 7. Users MS—serves as interaction with Users DB (described in more detail above), and BL of users.

The API layer 6003 comprises a store API 6302, an influencers API 6304, an authentication API 6306, and an administration or admin API 6308. The API layer 6003 provides a remote connection protocol for connecting remote computers and a plurality of different code languages with the system 6000. The API layer 6003 enables the user to invoke functions of the system 6000 at the storage and processing layer 6001 by interacting with the user interfaces of the user interface layer 6004. For example, the store API 6302 provides for the redirection of requests from the store UI 6402 to the e-commerce server 6110 via the customers MS 6201 and/or the products MS 6202. The other APIs in the API layer 6003 provide similar functionality. The influencers API provides for the redirection of requests between the influencers dashboard UI 6406 and the elements of the storage and processing layer 6001 via multiple microservices in the MS layer 6002. The API layer is a layer that connects the different clients (store, influencer back office and admin back office) with the data presented by the Microservices. The CGCF provides an API gateway that serves as an entry point for all API calls and manages routing such calls to the correct Microservice(s).

The UI layer 6004 comprises a set of user interfaces including the store UI 6402, the influencers dashboard 6406, and the admin UI 6408. The UIs in the UI layer 6004 represent user interface graphical screens (e.g., HTML-based webpages, and mobile UI displays) with interactive elements (e.g., graphical icons, commands, buttons, links, text entry fields, file uploading and downloading tools) presented to users, customers, influencers, and administrators via remote computing and/or mobile devices. The system 6000 can provide access to the functions of the storage and processing layer 6001 via the UI layer 6004 to an end user via any device that can run a web browser or access a web-based application. For example, the store UI 6402 provides access to an online store function that may be provided by the e-commerce server 6110, but the system 6000 may also be interfaced with via the influencer dashboard UI 6406 to access functionality associated with influencer type users such as the creation of looks objects and tags objects stored in the database server 6120.

Additionally, the admin UI 6408 provides for the administration and management of the system 6000 and any software or functionality at any layer level to administrative type users.

An analytics 6404 function may also be integrated into the UI layer 6004 or may be provided by a third-party provider. For example, GOOGLE Analytics may be used for web-based analytics services and data provided by the analytics 6404 function may be tracked, stored, processed and accessed via the system 6000 or may be tracked, stored, processed and accessed external to the system 6000.

In addition, a third-party payment processing partner 6405, e.g., Impact Radius (IR) (https://impact.com/manage-engage/), may be integrated with the CGCF such as via API to provide a hosted, web-based software toolset, e.g., IR's "Radius" tool. In this example, the Radius tool contains performance marketing program management tools enabling the CGCF to track impressions, clicks and conversions linked to influencers. Among the tools provided with the Radius tool are: (a) reporting and analysis tools; (b) Advertiser Account interface; (c) processing of Media Partners (e.g., influencers) compensation (including make-up goods, bonuses and placement fees) per agreements that may be implemented on the Radius tool between Media Partners (influences) and CGCF operating entity (e.g., the brand or company operating the CGCF and selling goods via the CGCF)("Partner Contracts"); (d) tools to analyze and investigate Media Partners (influencer) performance and traffic; (e) tools for managing Media Partner (influencer) compensation (locking, pending, or reversal for non-bona fide conversions); (f) multiple file transfer capability (FTP, etc.); (g) Media Partner (influencer) compensation forecasting and invoicing; and (h) distributing newsletters to Media Partners (influencers) via email or other means.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes or in any number of markets. Accordingly, the claims set forth below should be construed in view of the full breadth and spirit of the present invention as disclosed herein.

What is claimed is:

1. A system for facilitating content generation associated with a first remote user-type and consumer engagement associated with a second remote user-type, the system adapted to provide a central facility for managing remote user interactions of both first user-type and second user-type related to sale of goods or services, the system comprising:
   a central application server having a processor and a memory, the memory having stored thereon computer executable code, the central application server adapted to communicate with remote devices over a communications network;
   a microservices layer comprising a first user-type microservice and a second user-type microservice, and further comprising and one or more of a products microservice, a looks microservice, a tags microservice, and a video microservice, each microservice in the microservices layer processing requests for data, functions, and information relating to the microservice;
   an API layer providing access to one or more microservices in the microservices layer based on a user type associated with a user accessing the system via a user interface;
   at least one database adapted to store information and content related to product or service offerings, including user records, user generated content, and product or service records, and including a tags database;
   a first set of executable code executed by the processor to manage an influencer portal and cause the central application server to:
      communicate, via the API layer and at least one microservice in the microservices layer, with a first remote device associated with a first user, the first user associated with the first user-type, the first user-type being an influencer-type user;
      associate a first user record with the first user and store the first user record on the database;
      transmit for display at the first remote device, via the API layer and at least one microservice in the microservices layer, a user interface adapted to enable the first user to input information related to a "first look", the user interface including interface elements adapted to allow the first user to submit to the central application server a first image file and user-created descriptive content associated with the first look;
      receive from the first remote device, via the API layer and at least one microservice in the microservices layer, a first set of content related to the first look, the first set of content being created by the first user and including the first image file and the user-created descriptive content, the first set of content further including images of or references to a first product or service associated with a product or service record stored in the database; and
      cause the looks microservice to assign a unique identifier to the first look, store the unique identifier and the first set of content in the database, and associate the first look and the first set of content with the first user record; and
   a second set of executable code executed by the processor to cause the central application server to:

communicate, via the API layer and at least one microservice in the microservices layer, with a second remote device associated with a second user, the second user associated with the second user-type, the second user-type being a consumer-type user; and transmit for display at the second remote device via a user interface, the API layer, and at least one microservice in the microservices layer, a plurality of images associated with a plurality of looks including the first image file associated with the first look and a set of user selectable elements for selecting or deselecting presented images and associated looks.

2. The system of claim 1 wherein the second set of executable code executed by the processor is further adapted to cause the central application server to receive a request from the second user via the user interface for a more complete presentation of a set of content associated with an image selected from the plurality of images.

3. The system of claim 1 wherein the second set of executable code executed by the processor is further adapted to cause the central application server to associate a second user record with the second user and store the second user record on the database.

4. The system of claim 1 wherein the second set of executable code executed by the processor is further adapted to cause the central application server to:
receive signals associated with user inputs entered by the second user; and
present a reduced set of selected images in response to the received signal.

5. The system of claim 1 wherein the second set of executable code executed by the processor is further adapted to cause the central application server to:
receive a signal representing an image selected from the plurality of images; and
update a record associated with the selected image in the database.

6. The system of claim 1 wherein the second set of executable code executed by the processor is further adapted to cause the central application server to transmit to the second remote device a set of product information, the set of product information being related to a product linked to an image selected from the plurality of images.

7. The system of claim 1 wherein the second set of executable code executed by the processor is further adapted to cause the central application server to transmit to the second remote device the first set of content in response to the second user selecting an image associated with the first look.

8. The system of claim 7 wherein the second set of executable code executed by the processor is further adapted to cause the central application server to transmit to the second remote device product information including links or other user interface elements to facilitate purchase of a presented and selected product associated with the first look.

9. The system of claim 8 wherein the second set of executable code executed by the processor is further adapted to cause the central application server to facilitate a transaction related to the sale of a selected product by the second user and record a credit to the first user related to the selection of the image associated with the first look.

10. The system of claim 1, further comprising a communications interface for establishing one or more connections with one or more third-party platform or services, including at least one of: an influencer metric and payment processor; a user commentary interface; social media services (e.g., Instagram); and content delivery services (e.g., YouTube).

11. The system of claim 1 wherein the second set of executable code when executed by the processor is further adapted to cause the central application server to:
determine by a recommendation system comprising a machine learning module and using a collaborative filtering process a plurality of looks to be presented to the second user based on past behavior of the second user, relationships of the second user to other users, content similarity, and context similarity; and
transmit for display at the second remote device via a user interface a plurality of images associated with the plurality of looks including the first image file associated with the first look and a set of user selectable elements for selecting or deselecting presented images and associated looks.

* * * * *